(12) United States Patent
Yanagawa et al.

(10) Patent No.: US 9,302,649 B2
(45) Date of Patent: Apr. 5, 2016

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Wataru Yanagawa, Aichi-ken (JP); Masanori Ukai, Aichi-ken (JP); Masaru Ukita, Aichi-ken (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 125 days.

(21) Appl. No.: 14/182,520

(22) Filed: Feb. 18, 2014

(65) Prior Publication Data

US 2014/0239108 A1 Aug. 28, 2014

(30) Foreign Application Priority Data

Feb. 22, 2013 (JP) ................................. 2013-033338

(51) Int. Cl.
*B60R 22/38* (2006.01)
*B60R 22/46* (2006.01)
*B60R 22/02* (2006.01)
*B60R 22/34* (2006.01)

(52) U.S. Cl.
CPC ........... *B60R 22/4676* (2013.01); *B60R 22/023* (2013.01); *B60R 22/341* (2013.01); *B60R 2022/026* (2013.01)

(58) Field of Classification Search
CPC .......................... B60R 22/341; B60R 22/4676
USPC ....................................................... 242/379.1
See application file for complete search history.

(56) References Cited

U.S. PATENT DOCUMENTS

| | | | |
|---|---|---|---|
| 2008/0087754 A1* | 4/2008 | Aihara et al. .................. | 242/374 |
| 2008/0203210 A1* | 8/2008 | Nagata et al. ............... | 242/396.1 |
| 2011/0309178 A1* | 12/2011 | Yanagawa et al. ............. | 242/374 |
| 2011/0309179 A1* | 12/2011 | Yanagawa et al. ............. | 242/374 |
| 2011/0309181 A1* | 12/2011 | Yanagawa et al. .......... | 242/379.1 |
| 2011/0315805 A1* | 12/2011 | Yanagawa et al. ............. | 242/382 |
| 2012/0175451 A1* | 7/2012 | Yanagawa et al. .......... | 242/379.1 |
| 2012/0318903 A1* | 12/2012 | Yanagawa et al. .......... | 242/379.1 |
| 2012/0318904 A1* | 12/2012 | Ukita et al. ................ | 242/379.1 |

FOREIGN PATENT DOCUMENTS

JP 2009-184520 A 8/2009

\* cited by examiner

*Primary Examiner* — Sang Kim
(74) *Attorney, Agent, or Firm* — Roberts Mlotkowski Safran & Cole, PC

(57) ABSTRACT

In a webbing take-up device, configuration is made such that in a state in which a restriction wall of a cam gear is positioned at a lateral the side of a pin of a link configuring a switching section, the restriction wall abuts the pin when the link attempts to move. The restriction wall does not actively move the link regardless of the number of revolutions made by the cam gear. Operation noise of the link, a stopper pawl and a slide stopper accordingly does not occur during pull-out and take-up of webbing during normal usage, and a desirable user sensation is achieved in pull-out and take-up of the webbing during normal usage.

13 Claims, 15 Drawing Sheets

WEBBING TAKE-UP DEVICE

CROSS-REFERENCE TO RELATED APPLICATION

This application claims priority under 35 USC 119 from Japanese Patent Application No. 2013-033338 filed Feb. 22, 2013, the disclosure of which is incorporated by reference herein.

BACKGROUND

1. Field of the Invention

The present invention relates to a webbing take-up device configuring a vehicle seatbelt apparatus.

2. Related Art

In a webbing take-up device described in Japanese Patent Application Laid-Open (JP-A) No. 2009-184520, a gas generator is used to switch from a mode in which deformation is allowed to be caused in a second deformation portion of a torsion shaft to a mode in which deformation is not allowed to be caused in the second deformation portion, however such a configuration leads to an increase in costs. It has been noticed that amount of a webbing pulled out front a spool varies depending on frame of an occupant. A configuration in which, rotation of the spool in a pull-out direction is transmitted to a rotation body with the rotation speed being reduced and mechanically switching is performed between the above modes when a rotation position of the rotation body has reached a specific position, enables costs to be reduced.

However, when a switching section performs a switching operation to switch between the above modes in pull-out and take-up of the webbing during normal usage, operation noise may occur accompanying the switching operation, and/or a large amount of force may be required during the switching operation. This is detrimental to user sensation in pull-out and take-up of the webbing during normal usage.

SUMMARY

In consideration of the above circumstances, an object of the present invention is to obtain a webbing take-up device capable of switching between a mode that causes deformation of an energy absorption member and a mode that does not cause deformation of the energy absorption member, in a manner that is not detrimental to user sensation during normal usage.

A webbing take-up device according to a first aspect of the present invention includes: a spool that is rotated in a pull-out direction by a webbing that is taken up thereon being pulled out; an energy absorption member that has one end connected to the spool in a state in which relative rotation with respect to the spool is restricted, and that is deformed by a portion of the energy absorption member connected to the spool rotating relative to another end of the energy absorption member; a rotation body that, by being actuated, is connected to the another end of the energy absorption member in a state in which relative rotation with respect to the another end of the energy absorption member is restricted, and that is capable of rotating together with the energy absorption member; a switching section that, by engaging with the rotation body at an engaged position, restricts rotation of the rotation body accompanying rotation of the spool in the pull-out direction, that releases engagement with respect to the rotation body at a disengaged position which is apart from the engaged position, and that moves in a switching direction, which is from the engaged position toward the disengaged position or from the disengaged position toward the engaged position, interlockingly to rotation of the rotation body accompanying rotation of the spool in the pull-out direction; and a switching restriction member that moves interlockingly to the spool, and that faces the switching section at the switching direction side of the switching section at a specific position in a range of movement of the switching restriction member so that the switching restriction member restricts movement of the switching section towards the switching direction.

In the webbing take-up device of the first aspect of the present invention, the one end of the energy absorption member is connected to the spool in a relative rotation restricted state with respect to the spool. The rotation body is provided corresponding to the other end of the energy absorption member in the webbing take-up device. On actuation of the rotation body, the rotation body is connected to the other end of the energy absorption member in a relative rotation restricted state with respect to the energy absorption member. Accordingly in the connected state of the rotation body to the other end of the energy absorption member, when the spool attempts to rotate in the pull-out direction, the rotation body attempts to rotate in a direction corresponding to the pull-out direction rotation of the spool.

The switching section is provided to the webbing take-up device so as to correspond to the rotation body. The switching section is configured so as to be capable of moving in the switching direction that is the direction from the engaged position to the disengaged position, or the direction from the disengaged position to the engaged position. The switching section is capable of engaging with the rotation body at the engaged position, and rotation of the rotation body interlockingly to (in conjunction with) rotation of the spool in the pull-out direction is restricted when the switching section is engaged with the rotation body. When the spool rotates in the pull-out direction in this rotation restricted state of the rotation body, the one end of the energy absorption member rotates in the pull-out direction with respect to the other end of the energy absorption member. The energy absorption member therefore deforms.

In this state, the webbing is pulled out from the spool by an amount corresponding to the deformation of the energy absorption member, enabling an occupant wearing the webbing to move towards the vehicle front side under inertia by the length of the webbing thus pulled out from the spool, and a portion of the pulling force the body of the occupant pulling the webbing is absorbed by being expended in the deformation of the energy absorption member.

However, when the switching section is positioned in the disengaged position, engagement of the switching section with the rotation body is released, and the rotation restriction of the rotation body by the switching section is released. When the spool rotates in the pull-out direction in this state, the rotation body rotates accompanying the rotation of the spool. In this state, since relative rotation of the one end of the energy absorption member with respect to the other end of the energy absorption member does not occur, deformation of the energy absorption member such as that described above does not occur.

In the webbing take-up device of the present invention, the switching restriction member is connected to the spool, and the switching restriction member moves interlockingly to (in conjunction with) the spool. The switching restriction member faces the switching section at the switching direction side of the switching section when the switching restriction member is at the specific position in the range of the movement of the switching restriction member. In this state, movement of the switching section in the switching direction is restricted by the switching restriction member.

In this state, the switching section is therefore not able to move from the engaged position or from the disengaged position even when the rotation body rotates accompanying rotation of the spool in the pull-out direction, and it is not possible to switch from one of a mode in which the energy absorption member is allowed to deform or a mode in which the energy absorption member is not allowed to deform to the other of the mode in which the energy absorption member is allowed to deform or the mode in which the energy absorption member is not allowed. Whether or not switching between the above modes is performed therefore depends on whether movement of the switching member is restricted or is not restricted by the switching restriction member.

The switching restriction member moves interlockingly to (in conjunction with) the spool, and the switching restriction member restricts switching movement of the switching section by the switching member attempts to do switching movement in a state in which the switching restriction member has reached to the specific position within the movement range of the switching restriction member. There is therefore no particular movement of the switching section even when the switching restriction member rotates. Force is not required for switching movement of the switching section and operation noise of the switching section or the like does not occur in pull-out and take-up of the webbing during normal usage.

A webbing take-up device according to a second aspect of the present invention is the first aspect of the present invention, further including: a guiding section that directly or indirectly engages with each of the rotation body and the switching section, and that guides the switching section in the switching direction by moving interlockingly to rotation of the rotation body through a specific angle.

In the webbing take-up device of the second aspect of the present invention, the guiding section directly or indirectly engages with the rotation body, and the switching section directly or indirectly engages with the guiding section. When the spool rotates in the pull-out direction, and with accompanied this, the rotation body rotates by the specific angle, the guiding section moves interlockingly to (in conjunction with) the rotation of the rotation body. When the guiding section thus moves, the switching section is guided by the guiding section and is moved in the switching direction, the switching section moving from the engaged position to the disengaged position, or from the disengaged position to the engaged position. The webbing take-up device of the present invention accordingly enables the switching section to be moved in the switching direction mechanically interlockingly to (in conjunction with) rotation of the rotation body.

A webbing take-up device according to a third aspect of the present invention is the second aspect of the present invention, further including: a deformation portion that is provided at the guiding section or at the rotation body, that is deformed by rotation force of the rotation body in a state in which movement of the switching section in the switching direction is restricted by the switching restriction member, and that, by deforming, permits the rotation body to rotate through at least the specific angle.

In the webbing take-up device of the third aspect of the present invention, when the spool rotates in the pull-out direction, and with accompanied this, the rotation body is rotated by the specific angle, the guiding section moves interlockingly to (in conjunction with) the rotation of the rotation body. When the guiding section thus moves, the switching section is guided by the guiding section and is moved in the switching direction, and the switching section moves from the engaged position to the disengaged position, or from the disengaged position to the engaged position.

However, in a state in which the movement of the switching section in the switching direction is restricted by the switching restriction member, the switching section is not able to move from the engaged position to the disengaged position, or from the disengaged position to the engaged position. Since the switching section is guided and moved by the guiding section which moves, when the movement of the switching section in the switching direction is restricted, movement of the guiding section is also restricted, and therefore rotation of the rotation body is also restricted.

In the webbing take-up device of the present invention, when the spool attempts to rotate in the pull-out direction in a state in which rotation of the rotation body is indirectly restricted due to the restriction of switching direction movement of the switching section by the switching restriction member, due to the rotation force of the rotation body arising accompanying this, the deformation portion provided at the guiding section or the rotation body is deformed. When the deformation portion deforms, rotation of the rotation body by at least the specific angle is permitted.

In a configuration in which the switching direction of the switching section is the direction from the engaged position to the disengaged position, the rotation body rotates by the specific angle, so the switching section at the engaged position engages with the rotation body, thereby the rotation body is rotated.

On the other hand, in a configuration in which the switching direction of the switching section is the direction from the disengaged position to the engaged position, the rotation body is capable of rotating accompanying rotation of the spool in the pull-out direction.

A webbing take-up device according to a fourth aspect of the present invention is the third aspect of the present invention, wherein: the deformation portion is configured by a coupling portion, the coupling portion couples the guiding section and the rotation body so as to move the guiding section accompanying rotation of the rotation body, and the coupling portion releases coupling of the guiding section and the rotation body by breaking due to rotation of the rotation body accompanying rotation of the spool in the pull-out direction in a state in which movement of the guiding section is restricted.

According to the webbing take-up device of the fourth aspect of the present invention, the guiding section is coupled (connected) to the rotation body by the coupling portion that is as the deformation portion. The guiding section can accordingly move interlockingly to (in conjunction with) rotation of the rotation body.

On the other hand, when the rotation body attempts to rotate in a direction corresponding to rotation of the spool in the pull-out direction in a state in which movement of the guiding section is indirectly restricted due to switching direction movement of the switching section being restricted by the switching restriction member, rotation force of the rotation body breaks the coupling portion, so releasing the coupling between the guiding section and the rotation body. The rotation body is accordingly capable of rotating by at least the specific angle with movement of the guiding section being restricted.

A webbing take-up device according to a fifth aspect of the present invention is any one of the first aspect to the fourth aspect of the present invention, wherein: the switching section includes a rotation restriction member, the rotation restriction member is positioned in the engaged position in an initial state, the rotation restriction member restricts rotation of the rotation body by abutting an engagement portion, which is formed at the rotation body, due to rotation of the rotation body accompanying rotation of the spool in the pull-out direction, the rotation restriction member moves away from the rotation body by moving in the switching direction, and the rotation restriction member is retained at the disengaged position after moving in the switching direction.

In the webbing take-up device of the fifth aspect of the present invention, the switching section is configured including the rotation restriction member. The rotation restriction member is positioned in the engaged position in the initial state, and when the switching restriction member has reached the specific position in the movement range thereof in this state, movement of the rotation restriction member towards the switching direction is directly or indirectly restricted by the switching restriction member. When the rotation body rotates accompanying rotation of the spool in the pull-out direction in this state, the engagement portion of the rotation body abuts the rotation restriction member. Rotation of the rotation body, and therefore rotation of the other end of the energy absorption member, is accordingly restricted.

On the other hand, when the rotation body rotates accompanying rotation of the spool in the pull-out direction in a state in which the switching restriction member has not reached the specific position in the movement range thereof, the switching section actuates interlockingly to (in conjunction with) the rotation of the rotation body, the rotation restriction member moves from the engaged position to the disengaged position, and the rotation restriction member is retained at the disengaged position.

A webbing take-up device according to a sixth aspect of the present invention is any one the first aspect to the fifth aspect of the present invention, further including: a first energy absorption member serving as the energy absorption member; a second energy absorption member that has one end connected to the spool in a state in which relative rotation with respect to the spool is restricted, and that is deformed by a portion of the second energy absorption member connected to the spool rotating relative to another end of the second energy absorption member; a lock mechanism that actuates in a rapid deceleration state of a vehicle or in a case in which the spool reaches a predetermined rotation acceleration or higher in the pull-out direction, to restrict rotation of the another end of the second energy absorption member in the pull-out direction; and a trigger member that places the rotation body in an actuated state by connecting the rotation body to the another end of the first energy absorption member in a state in which the one end of the second energy absorption member has rotated through a specific angle or greater in the pull-out direction with respect to the another end of the second energy absorption member.

In the webbing take-up device of the sixth aspect of the present invention, the second energy absorption member is provided separately to (in addition to) the first energy absorption member that configures the energy absorption member described above. The one end of the second energy absorption member is connected to the spool in a state in which the relative rotation with respect to the spool is restricted, therefore, the second energy absorption member rotates together with the spool.

The lock mechanism is provided at the other end side of the second energy absorption member. The lock mechanism actuates in a rapid vehicle deceleration state and/or when the spool reaches the specific rotation acceleration or greater in the pull-out direction, thereby restricting rotation of the other end of the second energy absorption member in the pull-out direction.

As described above, the one end of the second energy absorption member is connected to the spool in a relative rotation restricted state with respect to the spool, so, when the lock mechanism actuates and rotation of the second energy absorption member in the pull-out direction is restricted, rotation of the spool in the pull-out direction is restricted, restricting the webbing from being pulled out from the spool.

In this state, when rotation force exceeding the mechanical strength of the second energy absorption member is transmitted from the spool to the one end of the second energy absorption member, the one end of the second energy absorption member rotates in the pull-out direction with respect to the other end of the second energy absorption member, and the second energy absorption member deforms. In this state, the webbing is pulled out from the spool by the amount corresponding to the deformation amount of the second energy absorption member, and the occupant over whom the webbing is mounted can move towards the vehicle front side under inertia by the length of the webbing thus pulled out from the spool. A portion of the pulling force that the body of the occupant pulls the webbing is absorbed by being expended in the deformation of the second energy absorption member.

Moreover, when the one end of the second energy absorption member rotates by the specific angle or greater in the pull-out direction with respect to the other end of the second energy absorption member, the trigger member connects the rotation body to the other end of the first energy absorption member, thus placing the rotation body in an actuated state.

A webbing take-up device according to a seventh aspect of the present invention is any one of the first aspect to the sixth aspect of the present invention, further including a reduction section that is interposed between the spool and the switching restriction member, and that rotates the switching restriction member by transmitting rotation of the spool to the switching restriction member while reducing a rotation, wherein: a reduction ratio, from the spool to the switching restriction member, of the reduction section is set such that a number of rotations of the spool as the spool rotates from an empty latched state to a fully pulled-out state is transmitted to the switching restriction member to be reduced less than one revolution, and a number of rotations of the spool as the spool rotates from a housed state to the fully pulled-out state is transmitted to the switching restriction member to be reduced one revolution or more, the empty latched state is a state in which a tongue provided at the webbing is attached in a buckle in a state in which an occupant is not seated in a seat; the fully pulled-out state is a state in which all of the webbing has been pulled out from the spool; and the housed state is a state in which the webbing has been taken up onto the spool as far as a vicinity of a leading end of the webbing.

In the webbing take-up device of the seventh aspect of the present invention, the switching restriction member is connected to the spool via the reduction section, and rotation of the spool is transmitted to the switching restriction member with being reduced, thereby the switching restriction member is rotated. The switching section described above moves in the switching direction due to the rotation of the rotation body accompanying rotation of the spool in the pull-out direction, however movement of the switching section in the switching direction is restricted by the switching restriction member when the rotation position of the switching restriction member is within the predetermined range.

The reduction ratio of the reduction section is set such that the number of rotation of the spool as the spool rotates from the empty latched state to the fully pulled-out state is transmitted to the switching restriction member to be reduced less than one revolution, and the number of rotation of the spool as the spool rotates from the housed state to the fully pulled-out state is transmitted to the switching restriction member to be reduced one revolution or greater, wherein the empty latched state is a state in which a tongue provided at the webbing is attached in a buckle in a state in which an occupant is not seated in a seat, the fully pulled-out state is a state in which all of the webbing has been pulled out from the spool, and the housed state is a state in which the webbing has been taken up onto the spool as far as a vicinity of a leading end of the webbing. The rotation of the switching restriction member from the empty latched state to the fully pulled-out state can accordingly be brought sufficiently close to a single revolution, enabling the precision of the switching position in the mode described above to be raised.

A webbing take-up device according to an eighth aspect of the present invention is the seventh aspect of the present invention, wherein the switching restriction member is provided so as to pass, by rotation, at a lateral side of the switching section at the switching direction side.

In the webbing take-up device of the eighth aspect of the present invention, the switching restriction member is provided so as to pass to the lateral side of the switching section at the switching direction side by rotation interlockingly to (in conjunction with) the spool. Switching movement of the switching section can accordingly be restricted if the switching restriction member has reached the switching movement direction side of the switching section. Moreover, since the switching restriction member merely passes to the lateral side of the switching section at the switching direction side by rotation interlockingly to (in conjunction with) the spool, the switching restriction member does not move the switching section in the switching direction, for example, even if the switching restriction member rotates by some number of revolutions from the housed state to the fully pulled-out state.

As described above, the webbing take-up device according to the present invention is capable of switching between a mode that allows to cause deformation of an energy absorption member and a mode that does not allow to cause deformation of the energy absorption member, in a manner that is not detrimental to user sensation during normal usage.

BRIEF DESCRIPTION OF THE DRAWINGS

An Embodiment of the invention will be described in detail with reference to the following figures, wherein.

DETAILED DESCRIPTION

Configuration of the Present Exemplary Embodiment

Figure 1:
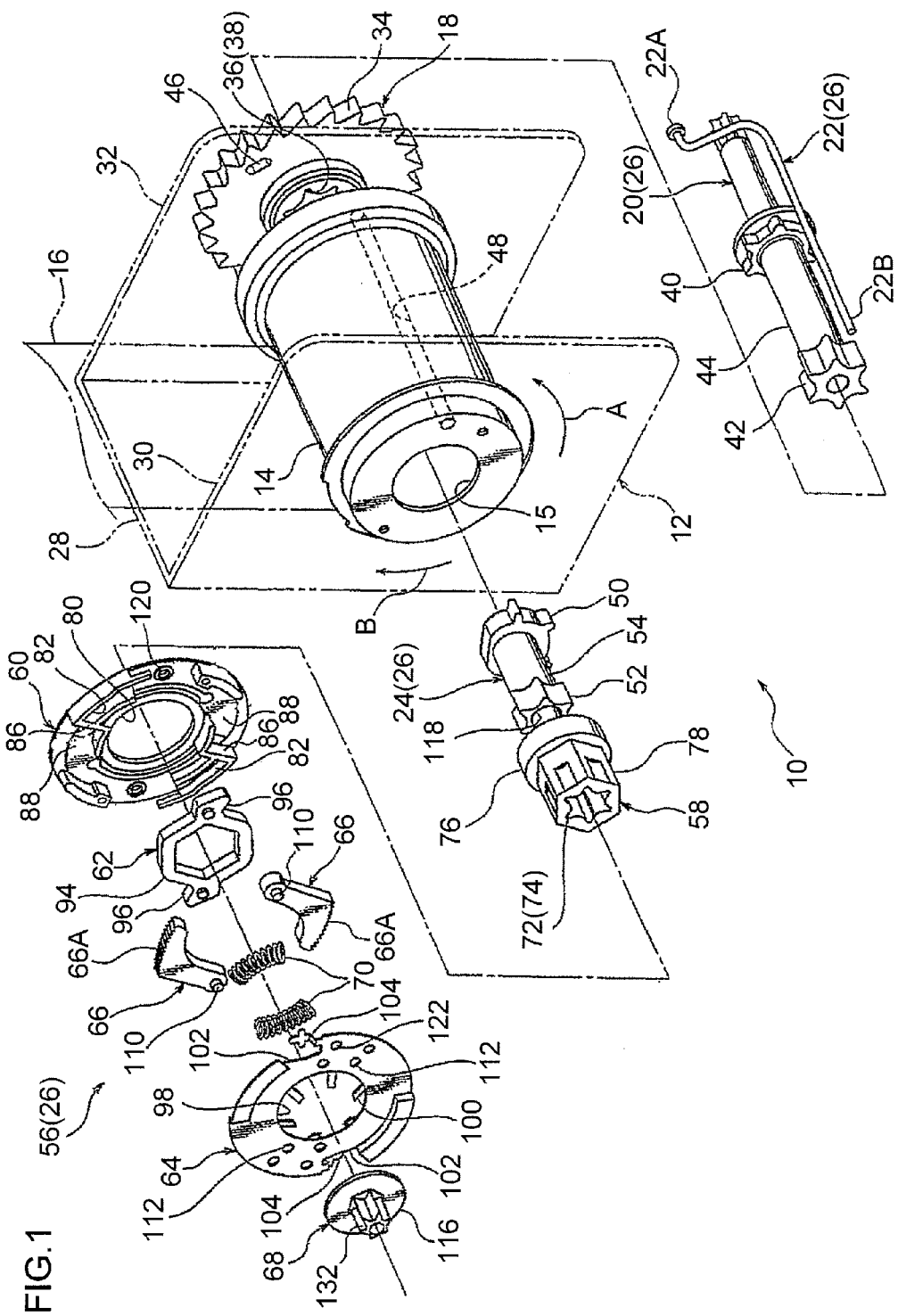
FIG. 1 is an exploded perspective view illustrating a webbing take-up device according to an exemplary embodiment of the present invention.

FIG. 1 is an exploded perspective view illustrating a configuration of a clutch mechanism 56 of a webbing take-up device 10 according to an exemplary embodiment of the present invention.

Figure 12:
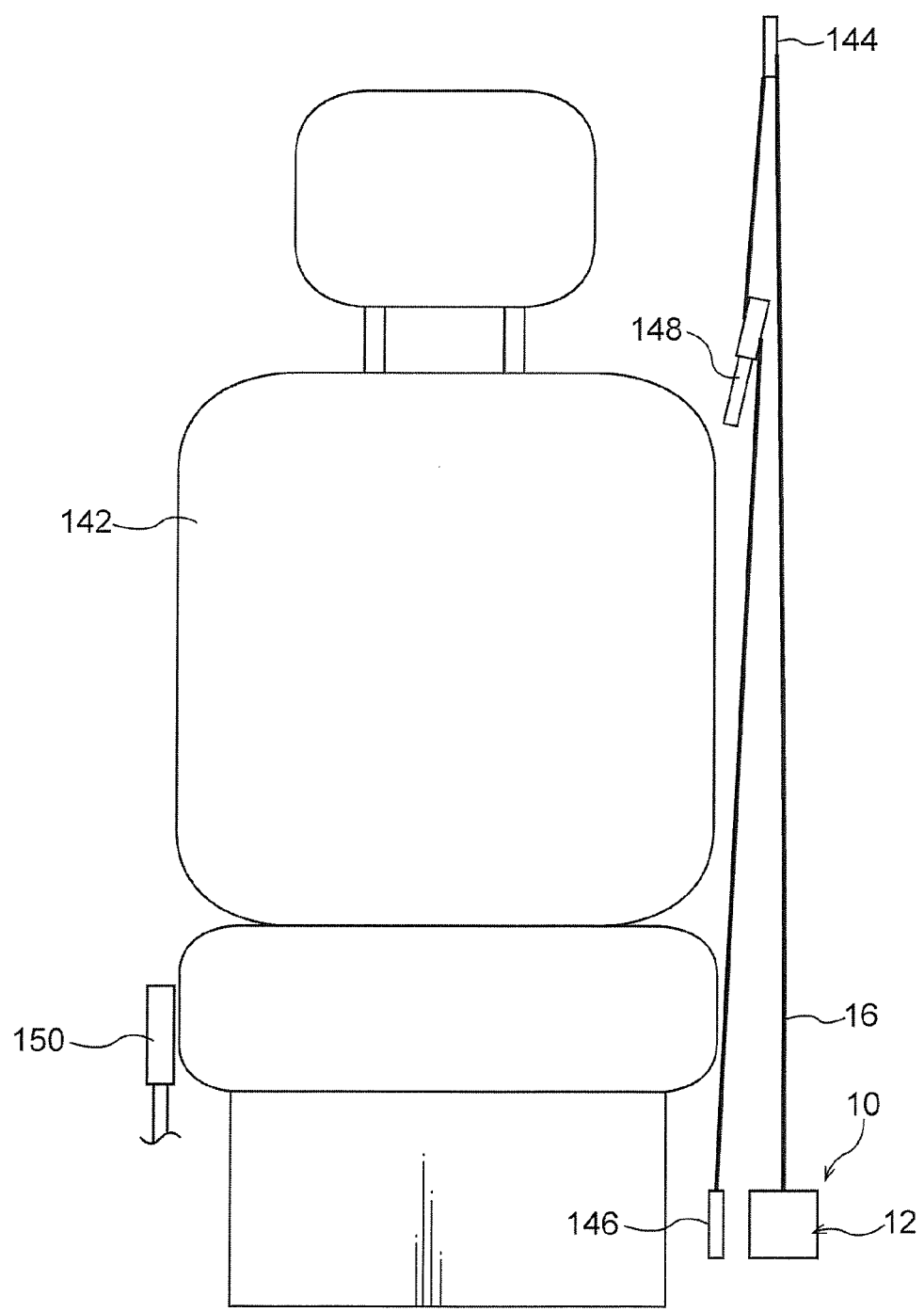
FIG. 12 is a schematic front face view of a seatbelt apparatus and a seat applied with a webbing take-up device according to an exemplary embodiment of the present invention.

As illustrated in FIG. 1, the webbing take-up device 10 includes a frame 12. The frame 12 includes a back plate 28. The back plate 28 is formed in a flat plate shape, with a leg plate 30 extending from one width direction end of the back plate 28 towards one thickness direction side of the back plate 28. A leg plate 32 extends from the back plate 28 in the same direction as the extension direction of the leg plate 30 at the other width direction end of the back plate 28. As illustrated in FIG. 12, the frame 12 is for example fixed to the vehicle body of a vehicle so as to correspond to a webbing take-up device 10 at the lateral side of a seat 142. Note that in the present exemplary embodiment, configuration is made wherein the frame 12 is fixed to the vehicle body, however the fixing location of the frame 12 is not limited to such a location, and configuration may for example be made wherein the frame 12 is fixed to a framework member of the seat 142.

As illustrated in FIG. 1, the webbing take-up device 10 is provided with a spool 14. The spool 14 axial center direction runs in the direction in which the leg plate 30 and the leg plate 32 face each other, with the majority of the spool 14 positioned between the leg plate 30 and the leg plate 32. A length direction base end side of an elongated strap shaped webbing 16 is anchored to the spool 14. The webbing 16 is taken up by winding in layers onto an outer peripheral portion of the spool 14 from the length direction base end portion when the spool 14 rotates around its axial center in one circumferential direction that is a take-up direction. When a length direction leading end side of the webbing 16 is pulled, the spool 14 rotates in a pull-out direction, that is the opposite direction to the take-up direction, and the webbing 16 taken up on the spool 14 is pulled out from the spool 14.

As illustrated in FIG. 12, the webbing 16 is pulled out from the spool 14 towards the vehicle upwards direction, passes through a slip joint 144 provided in the vicinity of an upper end portion of a center pillar, and is folded back on itself towards the downwards direction. An anchor plate 146 is attached to a leading end of the webbing 16 that is folded back towards the downwards direction, and the anchor plate 146 is fixed to the vehicle body or the framework member configuring the seat 142 at the side of the seat 142 provided with the frame 12 and the slip joint 144.

Figure 13:
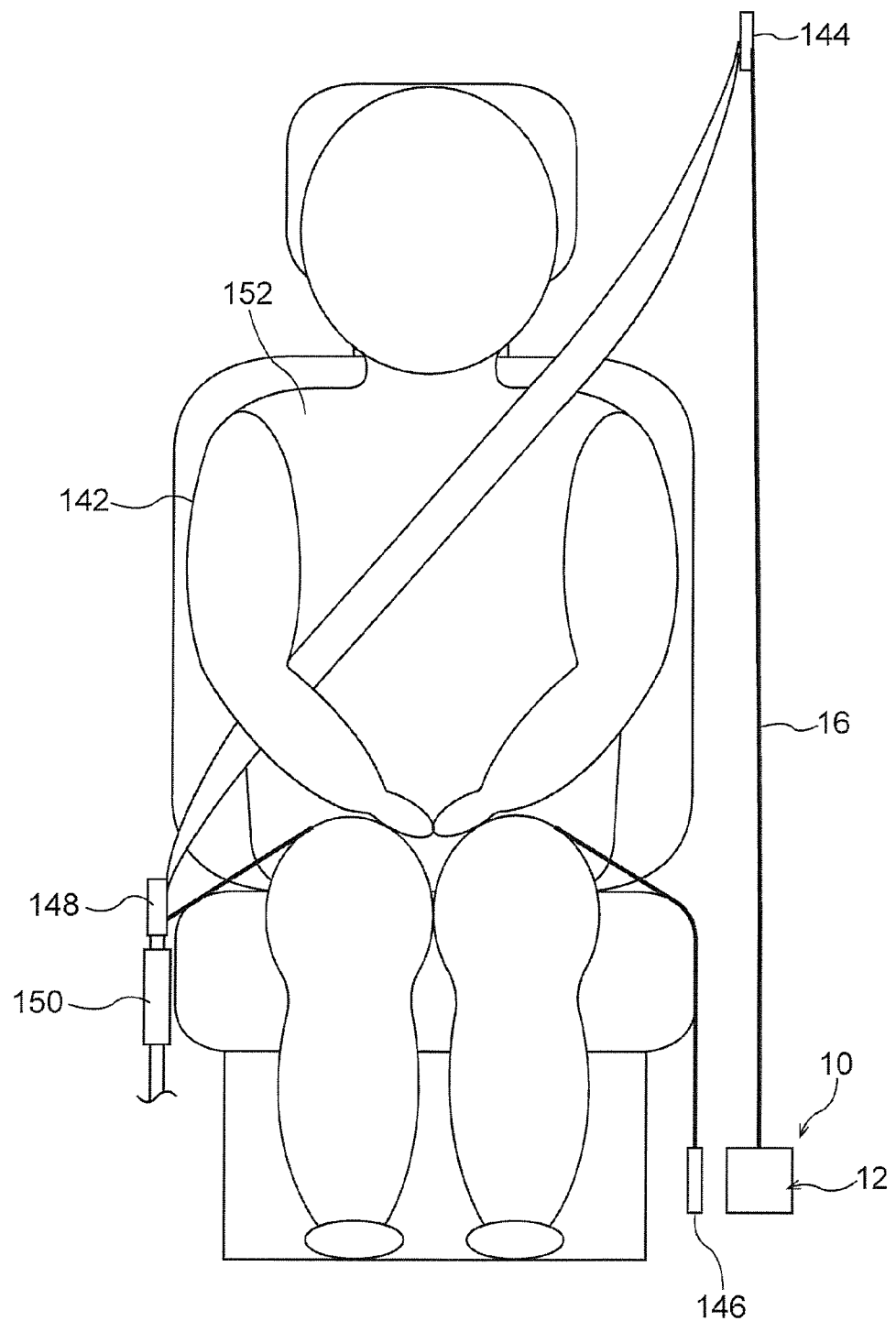
FIG. 13 is a front face view corresponding to FIG. 12 illustrating a mounted state of webbing over the body of an occupant.

A tongue 148 is provided to the webbing 16 between the anchor plate 146 and the slip joint 144. A buckle 150 is attached to the vehicle body or to a framework member configuring the seat 142 on the opposite side of the seat 142 to the anchor plate 146 so as to correspond to the tongue 148. As illustrated in FIG. 13, when mounting the webbing 16 to the body of an occupant 152, the tongue 148 is mounted into the buckle 150 with the webbing 16 in an entrained state around the front of the body.

As illustrated in FIG. 1, a through hole 15 is formed penetrating the spool 14 along the axial center direction. A main torsion shaft 20 and a sub torsion shaft 24 serving as an energy absorption member, configuring a force limiter mechanism 26, are provided inside the through hole 15.

The main torsion shaft 20 is disposed coaxially to the spool 14. A spline shaped lock gear side engagement portion 40 is formed at a length direction intermediate portion of the main torsion shaft 20, and a spline shaped spool side engagement portion 42 is formed at a length direction leading end portion of the main torsion shaft 20. An engaged-with portion (not illustrated in the drawings) is formed corresponding to the spool side engagement portion 42 at an inner peripheral portion of the through hole 15 at an axial center direction intermediate portion of the spool 14. The main torsion shaft 20 is connected to the spool 14 in a state in which relative rotation of the main torsion shaft 20 with respect to the spool 14 is restricted by engagement of the spool side engagement portion 42 with the engaged-with portion.

A lock gear 18 configuring a lock mechanism is provided at the leg plate 32 side of the spool 14 corresponding to the lock gear side engagement portion 40 of the main torsion shaft 20. The lock gear 18 is disposed coaxially to the spool 14, and a ratchet gear portion 34 is formed at an outer peripheral portion of the lock gear 18. A through hole 36 is formed penetrating the lock gear 18 in the axial center direction at an axial center portion of the lock gear 18. A spline shaped engaged-with portion 38 is formed at an inner peripheral portion of the through hole 36.

The lock gear side engagement portion 40 of the main torsion shaft 20 described above engages with the engaged-with portion 38 formed at the lock gear 18, thereby restricting relative rotation of the lock gear 18 with respect to the main torsion shaft 20, and therefore also restricting relative rotation of the lock gear 18 with respect to the spool 14. Accordingly, a main energy absorption portion 44 provided at the main torsion shaft 20 between the lock gear side engagement portion 40 and the spool side engagement portion 42 undergoes twisting deformation when the spool 14 rotates in the pull-out direction relative to the lock gear 18.

The lock gear 18 configures a lock mechanism of the webbing take-up device 10. The lock mechanism is provided with a lock pawl, not illustrated in the drawings, that is capable of moving towards and away from an outer peripheral portion (namely the ratchet gear portion 34) of the lock gear 18. Rotation of the lock gear 18 in the pull-out direction is restricted when the lock pawl approaches the outer peripheral portion of the lock gear 18 and enmeshes with the ratchet gear portion 34. As described above, relative rotation of the spool 14 with respect to the lock gear 18 is restricted through the main torsion shaft 20. Rotation of the spool 14 in the pull-out direction is accordingly restricted due to restricting rotation of the lock gear 18 in the pull-out direction, thereby restricting the webbing 16 from being pulled out from the spool 14.

The lock mechanism is provided with a sensor mechanism that actuates in the event of rapid (sudden) vehicle deceleration or in the event of rotation acceleration of the lock gear 18 in the pull-out direction reaching a specific level. Upon actuation of the sensor mechanism, the lock pawl moves to approach the outer peripheral portion of the lock gear 18.

The lock gear 18 is formed with an anchor hole 46 at a position further to the lock gear 18 rotation radial outside than the position formed with the through hole 36. A base end portion 22A of a trigger wire 22 serving as a trigger member is anchored in the anchor hole 46. A leading end side of the trigger wire 22 is inserted into an insertion hole 48 that is formed at the spool 14 parallel to the through hole 15. A leading end portion 22B of the trigger wire 22 projects out to the outside of the spool 14 from a leg plate 30 side opening end of the insertion hole 48.

The sub torsion shaft 24 is disposed coaxially to the spool 14 inside the through hole 15 so as to be further to the leg plate 30 side than the main torsion shaft 20. The sub torsion shaft 24 is formed with a spline shaped spool side engagement portion 50 at a base end portion of the sub torsion shaft 24, that is positioned at an axial center direction central side of the spool 14.

The spool side engagement portion 50 engages with an engaged-with portion, not illustrated in the drawings, formed at an inner peripheral portion of the through hole 15 at an axial center central side of the spool 14. Relative rotation of the sub torsion shaft 24 with respect to the spool 14 is accordingly restricted. A leading end portion of the sub torsion shaft 24 that is a leg plate 30 side end portion is formed with a spline shaped sleeve side engagement portion 52. A sub energy absorption portion 54 is configured on the sub torsion shaft 24 between the spool side engagement portion 50 and the sleeve side engagement portion 52.

The clutch mechanism 56 is provided on the leg plate 30 side of the spool 14. The clutch mechanism 56 is provided with a sleeve 58. A through hole 72 is formed penetrating the sleeve 58 in the axial direction at a sleeve 58 axial center portion, with the sub torsion shaft 24 entering inside the through hole 72. A leading end side of an inner peripheral portion of the sleeve 58 is formed with a spline shaped engaged-with portion 74. The sleeve side engagement portion 52 of the sub torsion shaft 24 engages with the engaged-with portion 74, thereby restricting relative rotation of the sleeve 58 with respect to the sub torsion shaft 24.

The clutch mechanism 56 is provided with a clutch guide 60. The clutch guide 60 is formed with a circular shaped through hole 80. A support portion 76 formed at the sleeve 58 passes through the through hole 80. The support portion 76 is configured in a circular shape with an outer diameter dimension substantially the same as (strictly speaking slightly smaller than) an inner diameter dimension of the through hole 80. The support portion 76 that penetrates the through hole 80 rotatably supports the clutch guide 60.

A clutch cover 64 is provided so as to face the clutch guide 60 at an axial direction side of the clutch guide 60. The clutch cover 64 is formed with a through hole 98 penetrating in the axial direction, with plural fitting clips 100 formed projecting from an inner peripheral portion of the through hole 98 towards the radial direction inside. The fitting clips 100 are formed at intervals of a specific angle around the through hole 98 circumferential direction, and engage with a fitting portion 78 that has a substantially hexagonal outer peripheral profile and is formed at the sleeve 58, thereby restricting displacement of the clutch cover 64 in both the circumferential direction and axial direction of the sleeve 58.

A pair of notch portions 102 are formed at the clutch cover 64 so as to open towards the clutch cover 64 radial direction outside. A cross shaped clip 104 is formed at the inside of each of the notch portions 102. The cross shaped clips 104 are bent into crank shapes as viewed along the clutch cover 64 radial direction, with leading end sides of the cross shaped clips 104 projecting out further towards the clutch guide 60 side and towards the take-up direction than base end sides thereof.

Coil springs 70 are respectively anchored at one end to each of the cross shaped clips 104. The clutch guide 60 described above is formed with coil spring housing portions 82 corresponding to the respective coil springs 70. The coil spring housing portions 82 are formed with recessed shapes that are open towards the pull-out direction side. In the housed state of the coil springs 70 inside the coil spring housing portions 82, the other ends of the respective coil springs 70 make pressing contact (abut) with pressing contact (abut) walls 86, that are bottom portions of the recess shaped coil spring housing portions 82, under the biasing force of the coil springs 70.

A hole portion 120 is formed at the clutch guide 60 corresponding to the leading end portion 22B of the trigger wire 22 that projects out from the opening end of the insertion hole 48 open at the leg plate 30 side end face of the spool 14. A hole portion 122 is formed in the clutch cover 64. The leading end portion 22B of the trigger wire 22 passes through the hole portion 120 and the hole portion 122. In this state, the coil springs 70 are compressed between the cross shaped clips 104 and the coil spring housing portions 82. When the leading end portion 22B of the trigger wire 22 comes out of the hole portion 120 and the hole portion 122, the clutch guide 60 rotates in the take-up direction with respect to the clutch cover 64 under the biasing force of the coil springs 70.

A pair of clutch plates 66 are provided between the clutch guide 60 and the clutch cover 64. The clutch guide 60 is formed with clutch plate housing portions 88 corresponding to the clutch plates 66. The clutch plate housing portions 88 are formed at take-up direction sides of the pressing contact walls 86 configuring the coil spring housing portions 82, and the respective clutch plates 66 are housed inside the clutch plate housing portions 88. Swing (rotating) shafts 110 are formed projecting out from clutch cover 64 side faces of base end portions of the clutch plates 66.

Hole portions 112 are formed at the clutch cover 64 corresponding to the swing shafts 110. The swing shafts 110 of the clutch plates 66 are inserted into the hole portions 112. The clutch guide 60 is supported on the clutch cover 64 so as to capable of swinging (rotating). The clutch plates 66 are housed inside the clutch plate housing portions 88. When the clutch guide 60 rotates in the take-up direction relative to the clutch cover 64, and the pressing contact walls 86 of the clutch guide 60 approach the hole portions 112 of the clutch cover 64 that supports the swing shafts 110 of the clutch plates 66, the pressing contact walls 86 of the clutch guide 60 press against clutch guide 60 axial center side opposing faces at the leading end sides of the clutch plates 66. The leading end sides of the clutch plates 66 thereby project out towards the radial direction outside of the clutch guide 60.

A clutch base 62 is moreover provided between the clutch guide 60 and the clutch cover 64. The clutch base 62 is provided with a fitted-to portion 94 that has a hexagonal shaped inner peripheral profile. The inner peripheral profile of the fitted-to portion 94 is formed substantially the same as the outer peripheral profile of the fitting portion 78, and the fitted-to portion 94 is fitted into the fitting portion 78. Relative rotation of the clutch base 62 with respect to the sleeve 58 is thereby restricted. An outer peripheral portion of the fitted-to portion 94 is formed with a pair of anchor portions 96. The anchor portions 96 face the clutch plates 66 from the clutch guide 60 radial direction inside.

Figure 2:
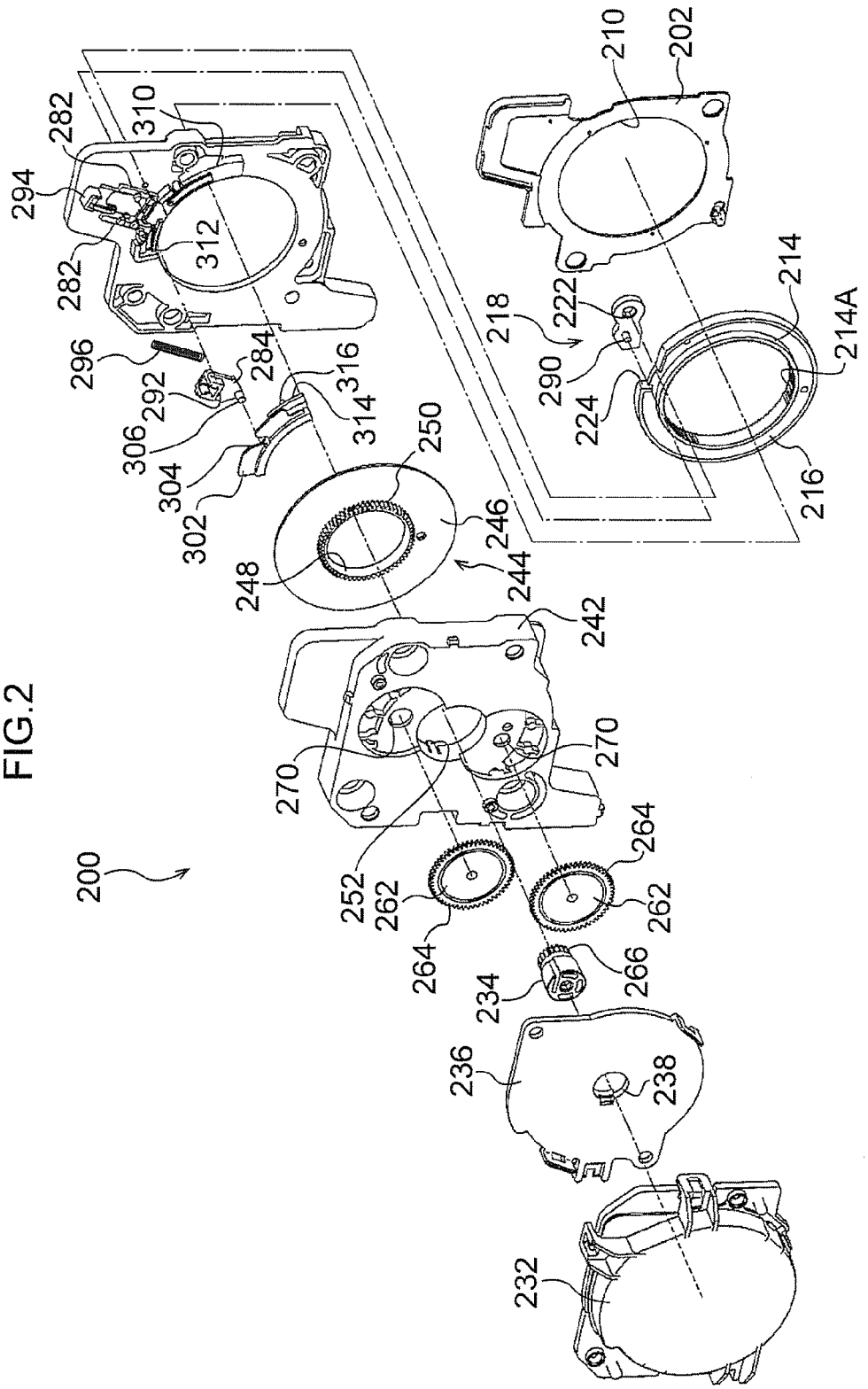
FIG. 2 is an exploded perspective view illustrating relevant portions of a webbing take-up device according to an exemplary embodiment of the present invention.

As illustrated in FIG. 2, a switching mechanism 200 of the webbing take-up device 10 is provided with a sheet member 202. A body 206 is provided on the opposite side of the leg plate 30 to the sheet member 202. A circular hole 208 is formed in the body 206, and a circular hole 210 is formed in the sheet member 202 facing the circular hole 208. A lock ring 214 serving as a rotation body is provided between the sheet member 202 and the body 206. The overall lock ring 214 is formed in a ring shape. An outer diameter dimension of the lock ring 214 is set slightly smaller than an inner diameter dimension of the circular hole 208 formed in the body 206. The lock ring 214 is fitted into the circular hole 208, such that the lock ring 214 is rotatably supported on the body 206.

A knurled tooth portion 214A is formed at an inner peripheral portion of the lock ring 214. Knurled tooth portions 66A are formed at the leading end sides of the clutch plates 66 so as to correspond to the knurled tooth portion 214A. When the leading end sides of the clutch plates 66 project out to the outside of the clutch plate housing portions 88, the knurled tooth portions 66A of the clutch plates 66 enmesh with the knurled tooth portion 214A of the lock ring 214. Relative rotation of the lock ring 214 with respect to the clutch plates 66, and therefore with respect to the sleeve 58, is thereby restricted.

A flange portion 216 extends out from an outer peripheral portion on the leg plate 30 side of an axial direction intermediate portion of the lock ring 214 towards the lock ring 214 radial direction outside. A stopper pawl 218 configuring a switching section and serving as a rotation restriction member is provided at the radial direction outside of the flange portion 216. The stopper pawl 218 includes a pawl main body 220.

Figure 3:
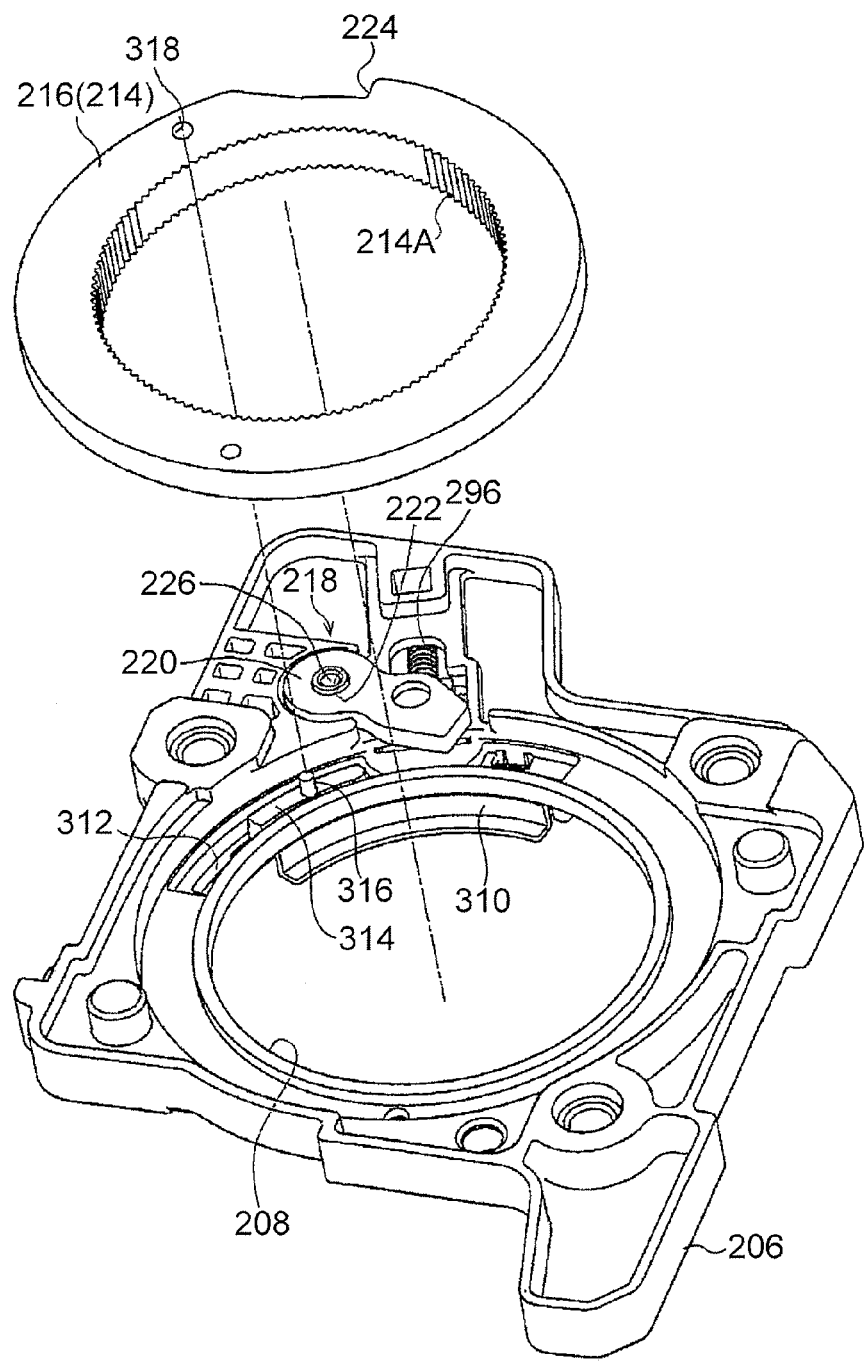
FIG. 3 is an enlarged exploded perspective view illustrating relevant portions of the body illustrated in FIG. 2 as seen from the opposite side to that shown in FIG. 2.

As illustrated in FIG. 3, a shaft portion 226 corresponding to the pawl main body 220 is formed at a sheet member 202 side of the body 206. The shaft portion 226 penetrates a hole portion 222 formed in the pawl main body 220. The stopper pawl 218 is accordingly supported by the shaft portion 226 (namely the body 206) so as to be capable of swinging (rotating) about an axis with axial direction in the same direction as the axial center direction of the spool 14. A notch portion 224 is formed at an outer peripheral portion of the flange portion 216 so as to correspond to a leading end of the stopper pawl 218. The leading end of the stopper pawl 218 enters inside the notch portion 224 at an engaged position about the shaft portion 226, with rotation of the lock ring 214 in the pull-out direction being restricted in this state.

As illustrated in FIG. 2, a spring case 232 is provided on the opposite side of the body 206 to the sheet member 202. A spiral spring is provided inside the spring case 232. A spiral direction outside end portion of the spiral spring is anchored to for example an inner wall of the spring case 232 or to an anchor rib provided inside the spring case 232. An adaptor 234 is provided inside the spring case 232 coaxially to the spool 14. The adaptor 234 is rotatably supported on a shaft portion formed inside the spring case 232, and a spiral direction inside end of the spiral spring inside the spring case 232 is anchored to the adaptor 234. The spiral spring is wound tighter when the adaptor 234 rotates in the pull-out direction, thus biasing the adaptor 234 in the take-up direction.

A spring sheet 236 is attached at the body 206 side of the spring case 232, and a body 206 side open end of the spring case 232 that houses the spiral spring and the adaptor 234 is closed off by the spring sheet 236.

A circular hole 238 that is coaxial to the spool 14 is formed at the spring sheet 236. A portion of the adaptor 234 provided inside the spring case 232 passes through the circular hole 238 and projects out towards the body 206 side. A spline shaft portion 132 is formed at a screw 68 illustrated in FIG. 1 so as to correspond to the adaptor 234 that passes through the circular hole 238. The spline shaft portion 132 fits into a spline hole open at a body 206 side end portion of the spring sheet 236, thereby restricting relative rotation of the adaptor 234 with respect to the screw 68.

A male threaded portion of the screw 68 is connected by screwing into a female threaded hole 118 of the sub torsion shaft 24. Relative rotation of the sub torsion shaft 24 with respect to the spool 14 is restricted at the spool side engagement portion 50. Relative rotation of the adaptor 234 with respect to the spool 14 is accordingly restricted, such that the adaptor 234 substantially rotates integrally with the spool 14.

A gear case 242 is provided between the spring sheet 236 and the body 206. A cam gear 244 configuring a reduction section and a restriction member is provided on the body 206 side of the gear case 242. The cam gear 244 includes a circular plate shaped main body 246. A circular hole 248 is formed at the center of the main body 246. A gear portion 250 is formed at a gear case 242 side face of the main body 246. The external diameter dimension of the gear portion 250 is smaller than the external diameter dimension of the main body 246, and the gear portion 250 is formed in a ring shape with an internal diameter dimension substantially the same as the internal diameter dimension of the circular hole 248. An outer peripheral portion of the gear portion 250 is formed with spur toothed outer teeth. The cam gear 244 is rotatably supported coaxially to the spool 14 by a resilient retaining tab 252 formed on the body 206 side of the gear case 242.

A pair of reduction gears 262 configuring the reduction section are provided at the spring sheet 236 side of the gear case 242. The reduction gears 262 are provided such that one of the reduction gears 262 is on the opposite side of the axial center (center of rotation) of the cam gear 244 to the other of the reduction gears 262. Each of the reduction gears 262 is provided with a large diameter gear portion 264. The large diameter gear portions 264 are set with axial direction running in the same direction as the axial center direction of the spool 14, and spur toothed outer teeth are formed at outer peripheral portions of the large diameter gear portions 264. The large diameter gear portion 264 is provided on the adaptor 234 side of the reduction gear 262, and enmeshes with spur toothed outer teeth formed at an outer peripheral portion of a gear portion 266 that configures the reduction section and is a portion in the adaptor 234 that projects out towards the spring sheet 236 outside.

Figure 4:
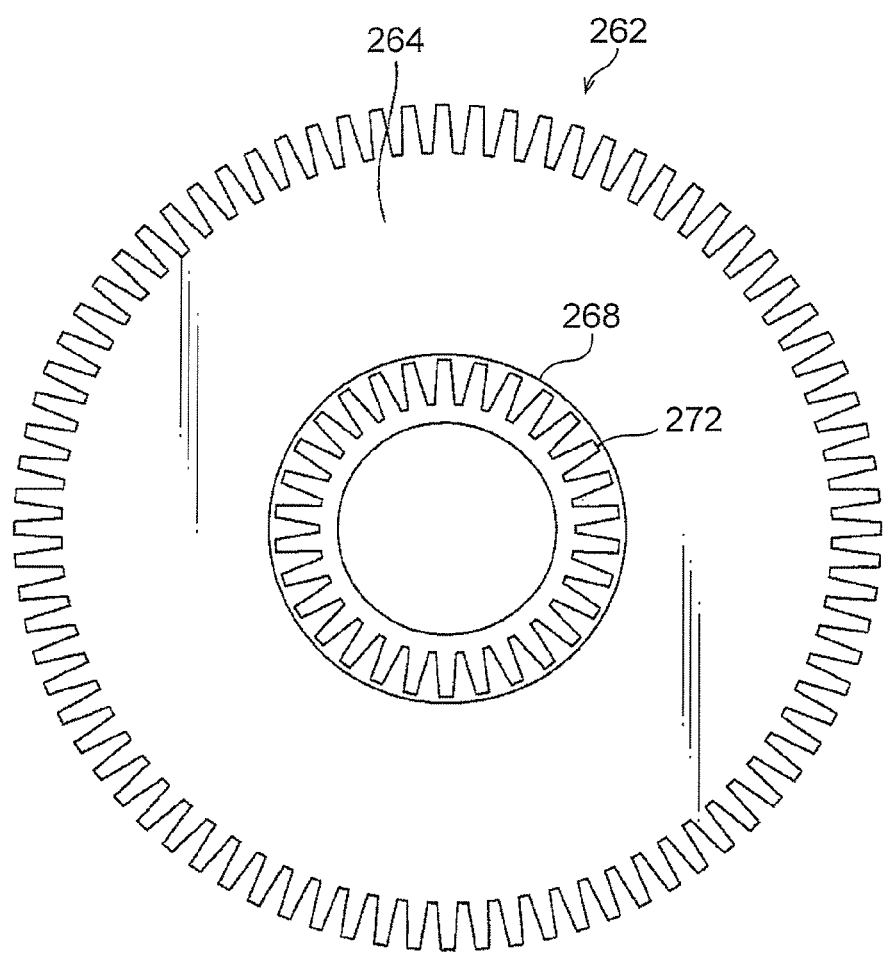
FIG. 4 is a side view illustrating a reduction gear configuring a reduction section as seen from the opposite side to the direction shown in FIG. 2.

As illustrated in FIG. 4, a boss portion 268 of smaller diameter than the large diameter gear portion 264 is formed on the body 206 side of the large diameter gear portion 264 so as to be coaxial to the large diameter gear portion 264. Shaft receiving holes 270, illustrated in FIG. 2, are formed through the gear case 242 corresponding to the respective boss portions 268. The boss portions 268 are rotatably supported in the shaft receiving holes 270. Small diameter gear portions 272 are formed on the opposite side of the boss portions 268 to the large diameter gear portions 264 so as to be coaxial to the boss portions 268. Spur toothed outer teeth are formed at the small diameter gear portions 272 so as to enmesh with the gear portion 250 of the cam gear 244 described above.

Namely, a spur toothed gear train is configured by the gear portion 266 of the adaptor 234, the reduction gears 262, and the gear portion 250 of the cam gear 244. The cam gear 244 accordingly rotates interlockingly to the spool 14.

Figure 14:
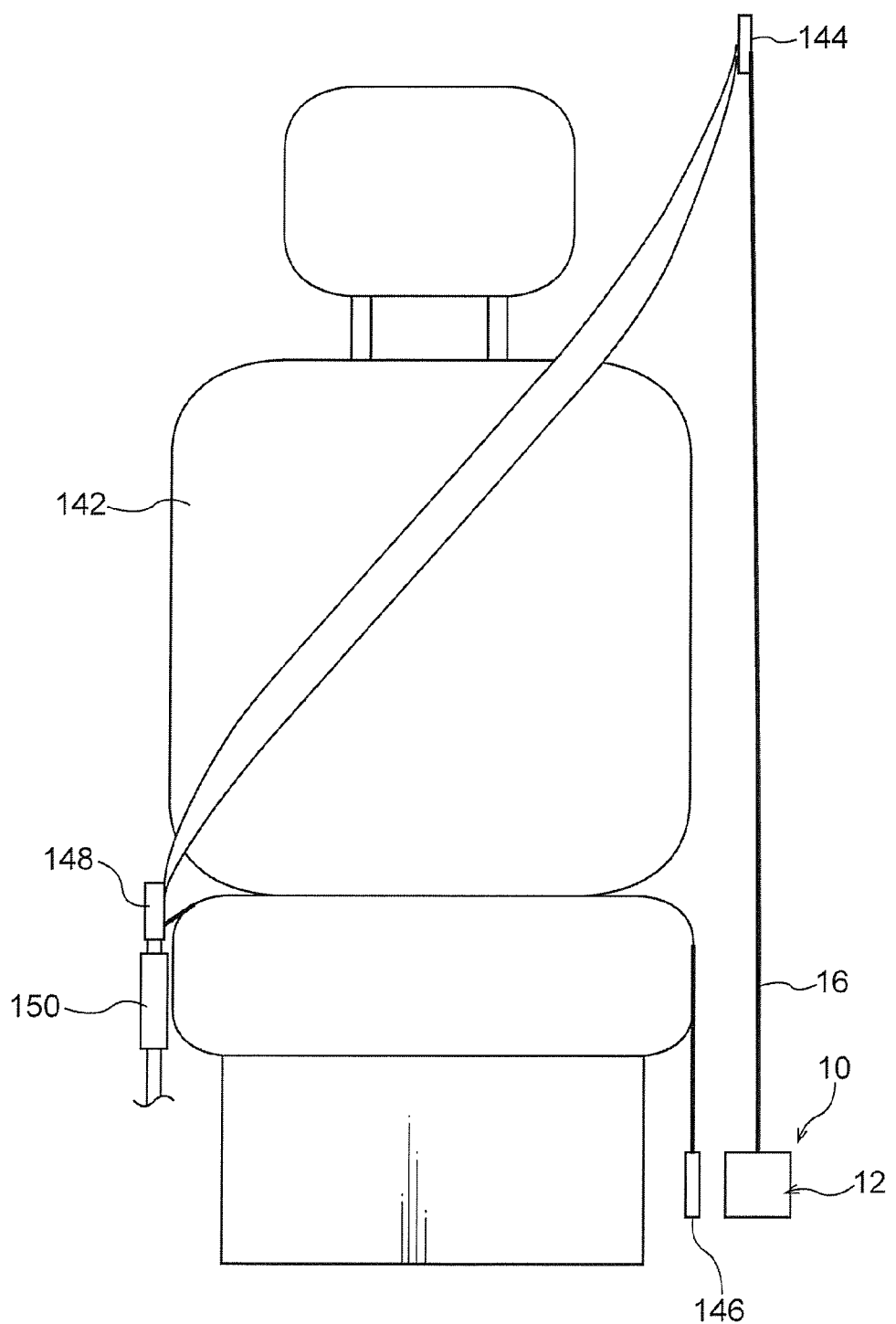
FIG. 14 is a front face view corresponding to FIG. 12 illustrating an empty latched state.

As illustrated in FIG. 14, a pull-out amount of the webbing 16 from the spool 14 in a state in which the tongue 148 is installed to the buckle 150 becomes the minimum in a state in which the tongue 148 is installed to the buckle 150 in a non-occupant 152 seated state of the seat 142. This state is referred to below as a "empty latched state". Moreover, as illustrated in FIG. 14, in a state in which the frame 12, the anchor plate 146, and the slip joint 144 are each attached at specific positions on for example the vehicle body or to framework members of the seat 142, the webbing 16 is still pulled out from the spool 14 by a length corresponding to the webbing 16, through the slip joint 144 to the anchor plate 146 from the spool 14, even in a state in which the spool 14 has taken up the webbing 16 to the maximum extent.

Figure 15:
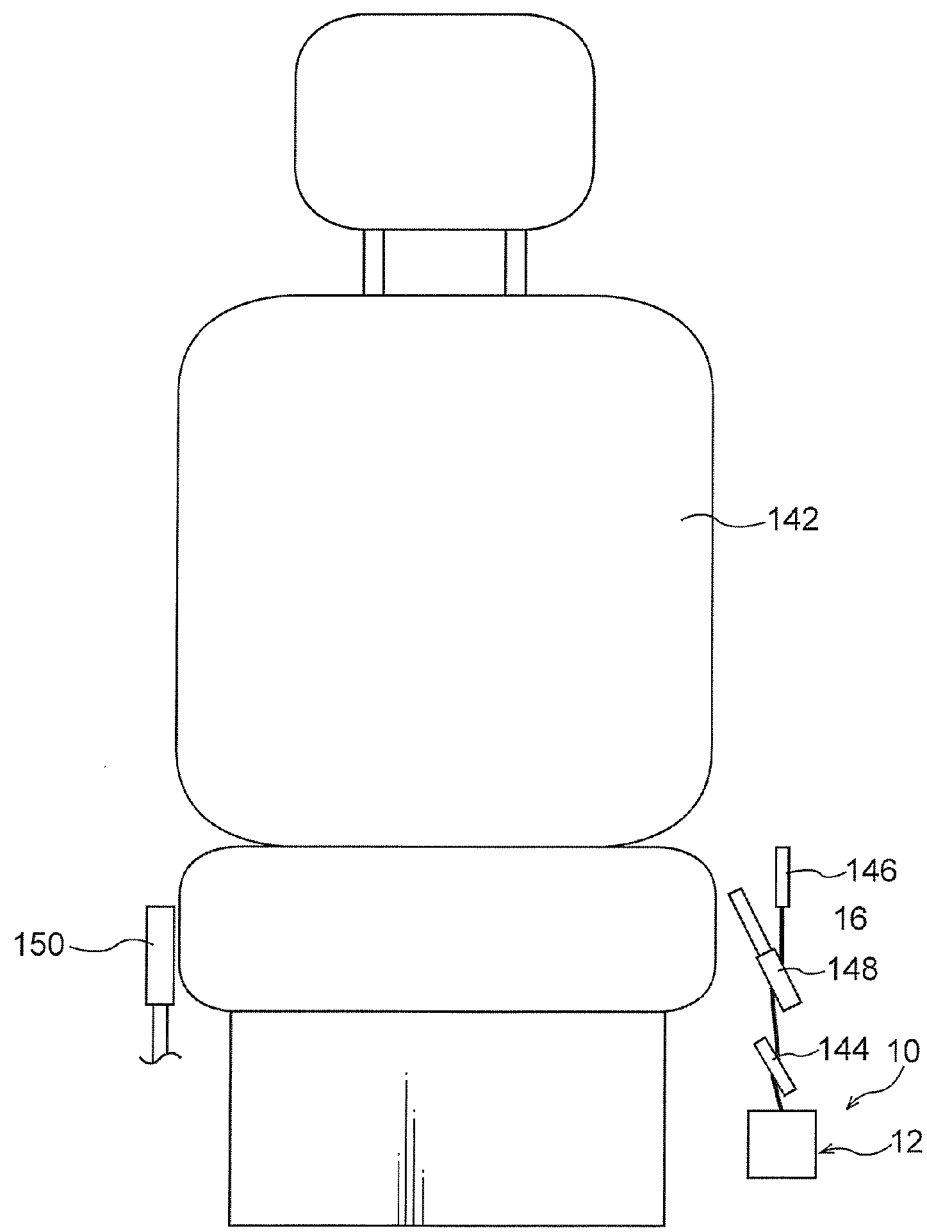
FIG. 15 is a front face view corresponding to FIG. 12 illustrating a housed state.

However, as illustrated in FIG. 15, in a state in which the frame 12, the anchor plate 146, and the slip joint 144 are not attached for example to the vehicle body or to framework members of the seat 142 at specific positions, the webbing 16 can be taken up onto the spool 14 as far as the vicinity of the anchor plate 146. In this state, the pull-out amount of the webbing 16 from the spool 14 is smaller than that in the state illustrated in FIG. 13. The state illustrated in FIG. 15 is referred to below as a "housed state".

In the present exemplary embodiment, the reduction ratio of the gear train configured by the gear portion 266 of the adaptor 234, the reduction gears 262 and the gear portion 250 of the cam gear 244 is set such that it reduces revolution of the spool 14 required from the empty latched state to a "fully pulled-out state" in which the webbing 16 is fully pulled-out from the spool 14 to less than one revolution of the cam gear 244, and it reduces revolution of the spool 14 required from the housed state to the fully pulled-out state to one revolution of the cam gear 244 or greater.

Figure 5:
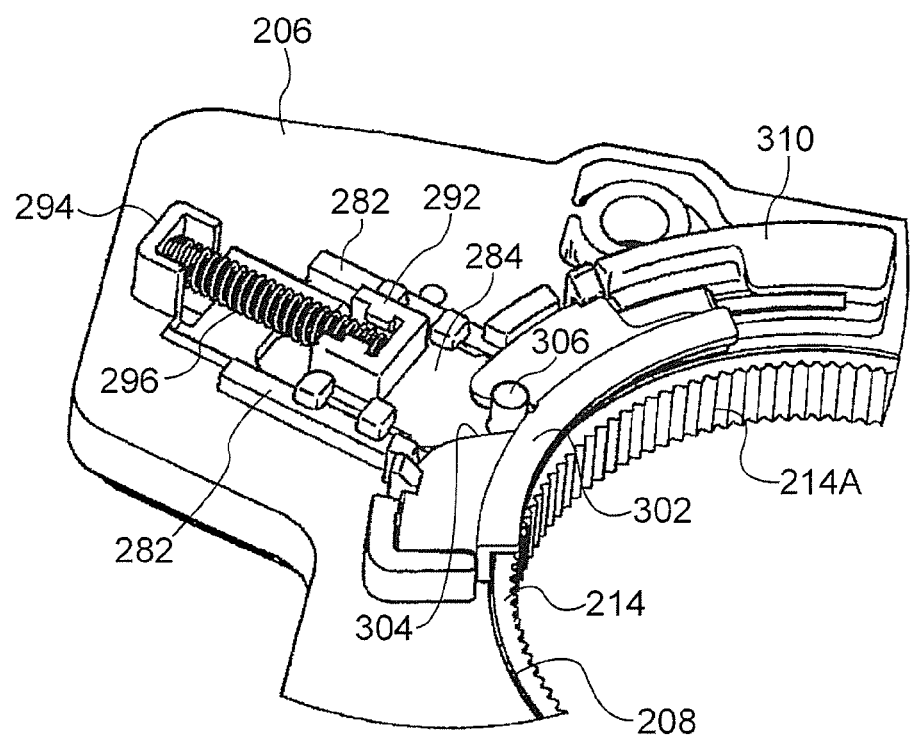
FIG. 5 is an enlarged exploded perspective view illustrating relevant portions in an assembled state of a switching section to the body shown in FIG. 2.

As illustrated in FIG. 2 and FIG. 5, a pair of link guides 282 are formed on the gear case 242 side of the body 206. The link guides 282 are formed at a lateral side of the circular hole 208, and are formed parallel to and facing each other across a virtual line passing through the center of the circular hole 208 in the circular hole 208 radial direction. It is penetrated in the body 206 in the thickness direction (namely in the circular hole 208 penetration direction) between the link guides 282. A link 284 configuring the switching section is provided between the link guides 282. The link 284 is formed in a plate shape, with the length direction of the link 284 running substantially in the circular hole 208 radial direction, and the thickness direction of the link 284 running in the circular hole 208 penetration direction. The link 284 is retained by the pair of link guides 282 described above so as to be capable of movement along the circular hole 208 radial direction.

Figure 7:
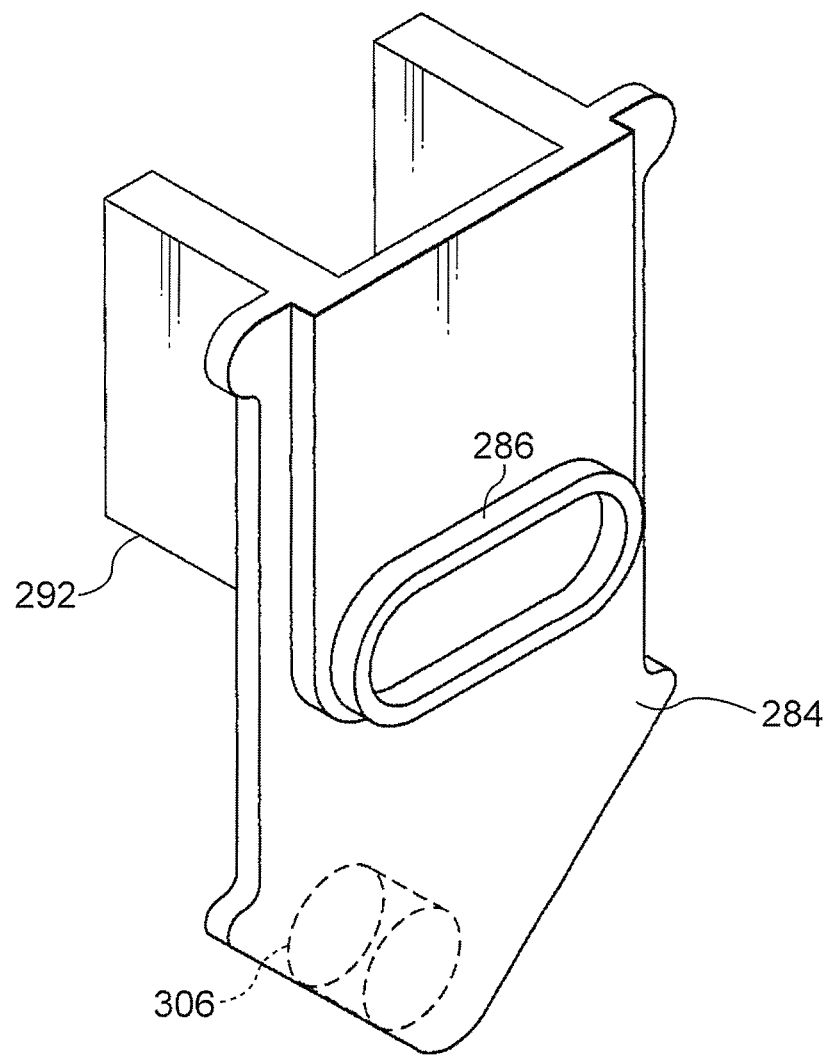
FIG. 7 is a perspective view illustrating a link configuring a switching section as seen from the opposite side to the direction shown in FIG. 2.

As illustrated in FIG. 7, a guide frame 286 is formed at a sheet member 202 side face of the link 284. The inner peripheral profile of the guide frame 286 is configured with an elongated hole shape with long direction along the direction in which the two link guides 282 face each other. A pin 290 is formed projecting out from a body 206 side face of the leading end side of the stopper pawl 218 so as to correspond to the guide frame 286. The pin 290 passes through an opening in the body 206 between the two link guides 282, and enters the inside of the guide frame 286.

The pin 290 is capable of moving between one long direction end and the other long direction end of the inner peripheral portion of the guide frame 286. When, guided by the link guides 282, the link 284 moves towards the outside of the radial direction of the circular hole 208, the pin 290 is pressed by the guide frame 286. When pin 290 is pressed by the guide frame 286, the stopper pawl 218 swings (rotates) about the shaft portion 226 in a switching direction of the present exemplary embodiment. When the stopper pawl 218 thus swings in the switching direction and arrives at a disengaged position which is away from the engaged position, the leading end side of the stopper pawl 218 comes out of the notch portion 224 formed in the flange portion 216 of the lock ring 214.

Note that in the present exemplary embodiment, the swinging (rotating) direction of the stopper pawl 218 about the shaft portion 226, to which direction the leading end side of the stopper pawl 218 comes outside of the notch portion 224 of the lock ring 214, is referred to as the "switching direction" of the rotation restriction member. However, there is no limitation of the "switching direction" of the rotation restriction member thereto. For example, a state in which the leading end side of the stopper pawl 218 has come out of the notch portion 224 of the lock ring 214 may be taken as an initial state, with the direction from the disengaged position towards the engaged position configuring the switching direction. Configuration may moreover be made with another rotation restriction member provided so as to be capable of moving in the center axial direction of the lock ring 214 in place of the stopper pawl 218, with the center axial direction of the lock ring 214 as the switching direction.

A spring anchor portion 292 is formed at a gear case 242 side face of the link 284. A spring anchor portion 294 is formed at a gear case 242 side face of the body 206. The spring anchor portion 294 is formed at the circular hole 208 radial direction outer side portion than the link guides 282, and faces the spring anchor portion 292 of the link 284 in the circular hole 208 radial direction. A compression coil spring 296 is provided between the spring anchor portion 292 and the spring anchor portion 294, with biasing force of the compression coil spring 296 biasing the link 284 towards the circular hole 208 radial direction inside.

As illustrated in FIG. 2 and FIG. 5, a slide stopper 302 serving as a guiding section is provided to the gear case 242 side of the body 206. A stopper guide 310 is formed at the body 206 corresponding to the slide stopper 302. The stopper guide 310 is formed at the gear case 242 side face of the body 206 so as to follow the circular hole 208 at the circular hole 208 outside. The slide stopper 302 is capable of movement within a specific range around an inner peripheral edge of the circular hole 208 in a retained state of the slide stopper 302 by the stopper guide 310.

As illustrated in FIG. 2, a groove 312 penetrates the body 206 between the stopper guide 310 and the circular hole 208. The groove 312 is curved with a curvature centered on the center of the circular hole 208. As illustrated in FIG. 3, a fitting-in portion 314 of the slide stopper 302 fits inside the groove 312 so as to be capable of moving along the groove 312 around the circular hole 208 circumferential direction. A shear pin 316, serving as a coupling portion that is one aspect of a deformation portion, is formed projecting out from the fitting-in portion 314 towards the sheet member 202 side.

An insertion hole 318 is formed at the flange portion 216 of the lock ring 214 so as to correspond to the shear pin 316. The shear pin 316 is inserted into the insertion hole 318, thereby coupling the slide stopper 302 to the lock ring 214, such that the slide stopper 302 moves (rotates) accompanying the lock ring 214. However, when the lock ring 214 attempts to rotate in a movement (rotation) restricted state of the slide stopper 302 and if a shear load imparted to the shear pin 316 exceeds the mechanical strength of the shear pin 316, the shear pin 316 breaks, such that the lock ring 214 rotates separately to the slide stopper 302.

As illustrated in FIG. 2 and FIG. 5, a guide groove 304 is formed in the slide stopper 302. The guide groove 304 is open at a circular hole 208 radial direction outside end portion of the slide stopper 302. A pin 306 is formed at the link 284 corresponding to the guide groove 304.

Figure 6:
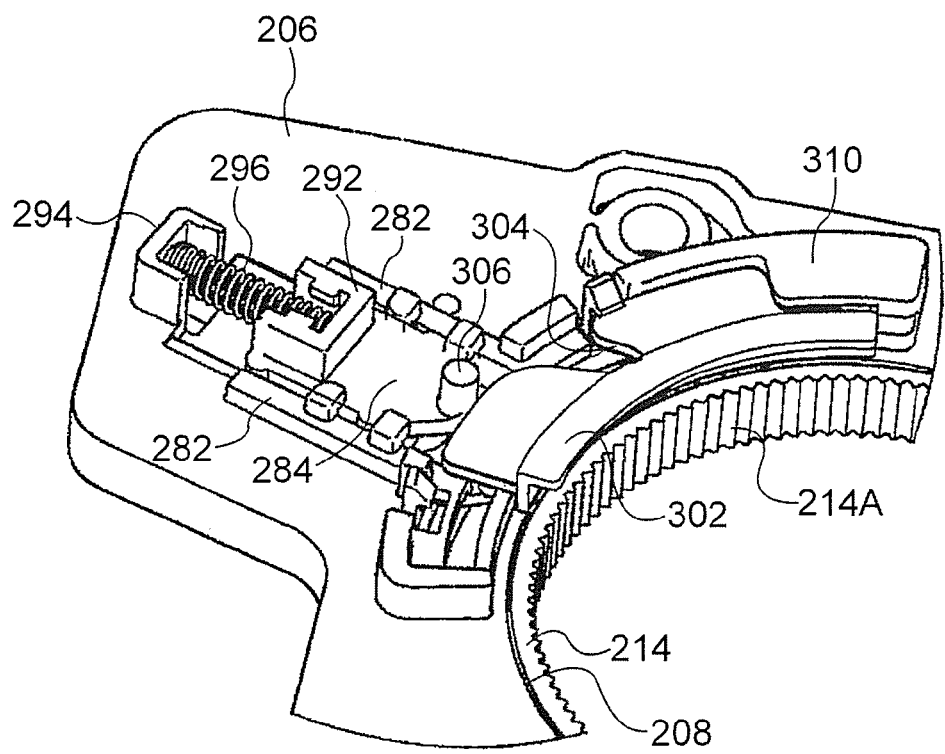
FIG. 6 is an enlarged perspective view corresponding to FIG. 5 illustrating relevant portions of in a state in which a switching section has moved from an engaged position to a disengaged position.
Figure 9:
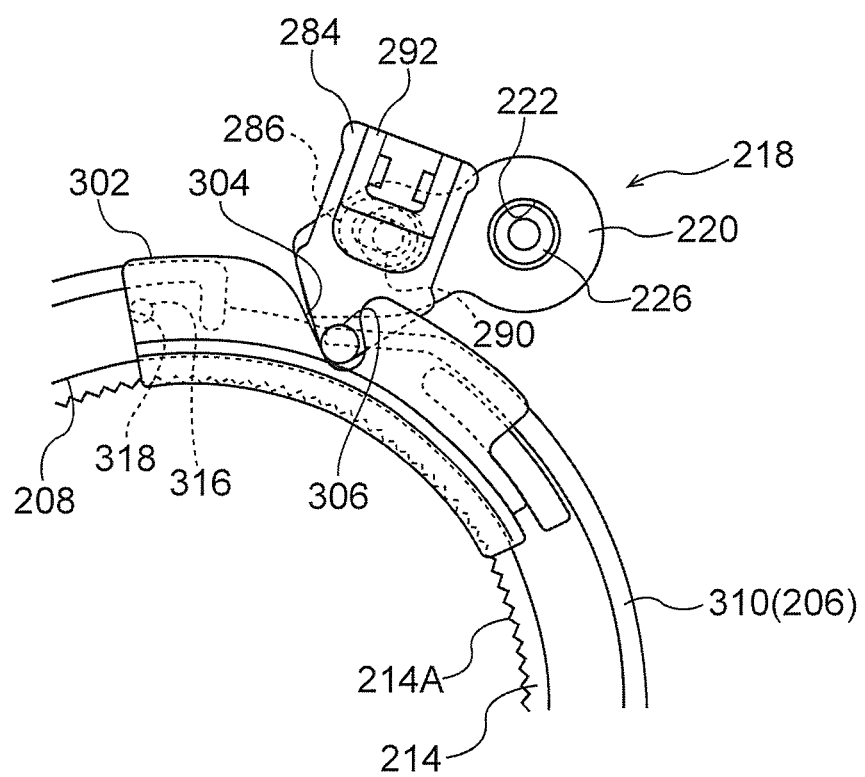
FIG. 9 is an enlarged side view illustrating a switching section in an initial state (a state at an engaged position)
Figure 10:
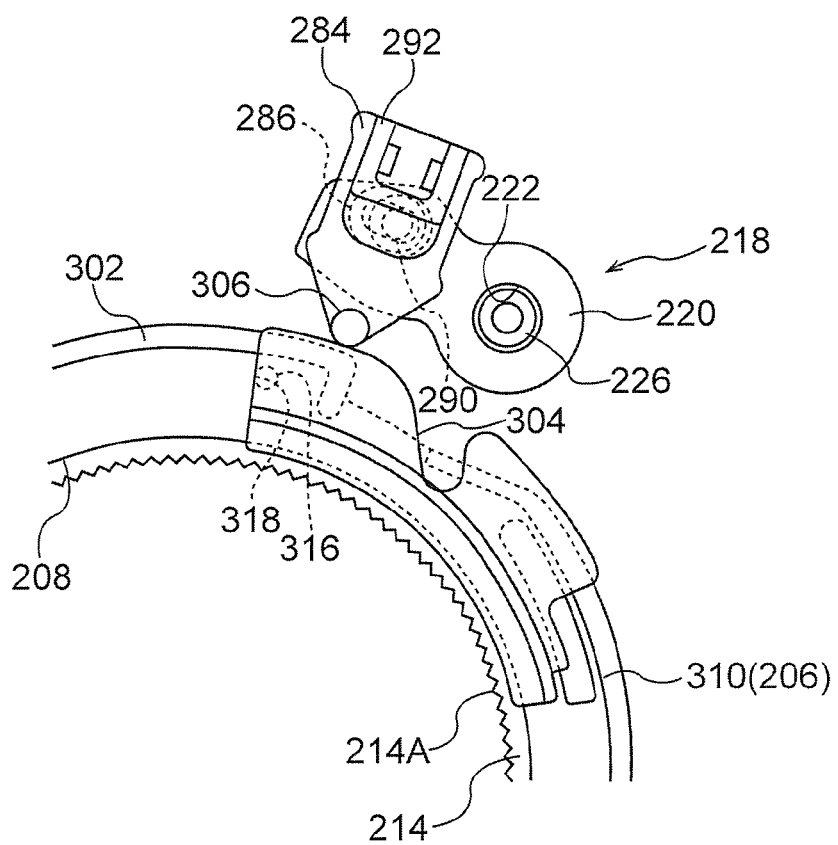
FIG. 10 is a side view corresponding to FIG. 9 illustrating a state in which engagement between a rotation body and the switching section has been released.

The pin 306 is formed projecting out from a circular hole 208 radial direction inside end portion of the link 284 towards the gear case 242 side, and enters in the guide groove 304, as illustrated in FIG. 5 and FIG. 9. The guide groove 304 is open at the circular hole 208 radial direction outside end portion of slide stopper 302, and when the slide stopper 302 rotates in the pull-out direction together with the lock ring 214, an inner wall of the guide groove 304 presses the pin 306 and moves towards the circular hole 208 radial direction outside. As illustrated in FIG. 6 and FIG. 10, the pin 306 accordingly comes out of the guide groove 304. When the pin 306 is thus moved guided by the guide groove 304, the link 284 is guided by the link guides 282 and moves towards the circular hole 208 radial direction outside.

Note that the stopper pawl 218 is at the engaged position in the initial state, and the leading end side of the stopper pawl 218 is inside the notch portion 224 at this state. However, in the initial state, the leading end of the stopper pawl 218 and an inner wall of the notch portion 224 that faces the leading end of the stopper pawl 218 at the take-up direction side are separated from each other in the lock ring 214 circumferential direction. The lock ring 214 is capable of rotating with respect to the stopper pawl 218 in the pull-out direction accompanying the slide stopper 302 until the pin 306 inside the guide groove 304 has moved inside the guide groove 304 so as to come out as far as the outside of the slide stopper 302.

Moreover, when the slide stopper 302 has moved (rotated) in the pull-out direction accompanying the lock ring 214 by a specific angle or greater, the specific angle being the angle required for the pin 306 inside the guide groove 304 to come out outside of the slide stopper 302 as described above, then rotation of the slide stopper 302 in the pull-out direction is restricted by the stopper guide 310. In this state, the shear pin 316 breaks when the lock ring 214 that is attempting to rotate further in the pull-out direction imparts a shear load exceeding the mechanical strength of the shear pin 316. Coupling between the lock ring 214 and the slide stopper 302 is thereby released, and the lock ring 214 rotates further in the pull-out direction.

Figure 8:
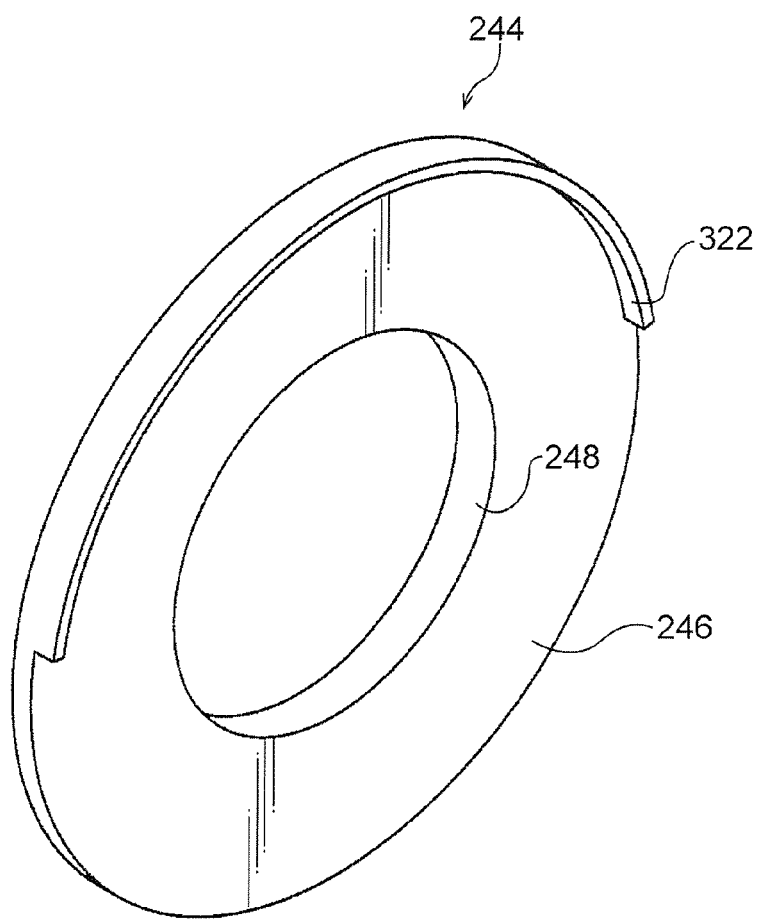
FIG. 8 is a perspective view illustrating a switching restriction member from the opposite side to the direction shown in FIG. 2.

A restriction wall 322 that effectively configures a restriction portion of the restriction member is formed at the cam gear 244 described above corresponding to the leading end side of the pin 306 that projects out further towards the gear case 242 side than the guide groove 304. As illustrated in FIG. 8, the restriction wall 322 extends from a part of an outer peripheral portion of the cam gear 244 towards the body 206 side. The position where the restriction wall 322 is formed is set so as to pass to the circular hole 208 radial direction outer side than the pin 306 by rotation of the cam gear 244.

The position of the cam gear 244 is set such that the restriction wall 322 faces the pin 306 at the circular hole 208 radial direction outside between from the rotation position of the spool 14 in the empty latched state described above to the rotation position of the spool 14 at a specific position between the empty latched state and the fully pulled-out state. When the link 284 attempts to moves towards the circular hole 208 radial direction outside in the facing state of the restriction wall 322 and the pin 306, the restriction wall 322 contacts (abuts) the pin 306, thereby restricting movement of the link 284.

Operation and Advantageous Effects of the Present Exemplary Embodiment Explanation follows regarding operation and advantageous effects of the present exemplary embodiment.

In the webbing take-up device 10, when the occupant 152 mounts the webbing 16 over the body of the occupant 152, the occupant 152 pulls on the webbing 16, thus pulling the webbing 16 out from the spool 14. The thus pulled-out webbing 16 is entrained over the body of the occupant 152, and in this state the tongue 148 is mounted to the buckle 150 to achieve a mounted state of the webbing 16 over the body of the occupant 152.

In this state, in for example a rapid deceleration state of the vehicle whilst traveling, the deceleration of the vehicle causes the body of the occupant 152 to move towards the vehicle front under inertia. When this causes rotation acceleration of the spool 14 in the pull-out direction to exceed a specific level, the sensor configuring the lock mechanism is actuated, and the lock pawl enmeshes with the ratchet gear portion 34 of the lock gear 18. Rotation of the lock gear 18 in the pull-out direction is accordingly restricted. Relative rotation of the lock gear 18 with respect to the spool 14 through the main torsion shaft 20 is restricted. The restriction of pull-out direction rotation of the lock gear 18 thereby restricts rotation of the spool 14 in the pull-out direction. The webbing 16 is accordingly restricted from being pulled out from the spool 14, and the body of the occupant 152 is firmly restrained by the webbing 16.

In this state, when the body of the occupant 152 attempting to move towards the vehicle front under inertia, it causes a pull-out direction rotation force imparted to the spool 14 through the webbing 16, and when the rotation force exceeds the mechanical strength of the main energy absorption portion 44 of the main torsion shaft 20, the spool side engagement portion 42 of the main torsion shaft 20 rotates in the pull-out direction with respect to the lock gear side engagement portion 40, such that the main energy absorption portion 44 undergoes twisting deformation. As a result, firstly the webbing 16 is pulled out from the spool 14 by a rotation amount of the spool 14 corresponding to the twisting deformation of the main energy absorption portion 44, thereby enabling the body of the occupant 152 to moves towards the vehicle front under inertia by this, and a part of the pulling force that the body of the occupant 152 pulls the webbing 16 is absorbed due to being expended in the twisting deformation of the main energy absorption portion 44.

Moreover, when the main energy absorption portion 44 of the main torsion shaft 20 undergoes twisting deformation, the spool 14 rotates in the pull-out direction with respect to the lock gear 18. Namely, taking the spool 14 as a reference, it is the lock gear 18 relative rotation in the take-up direction with respect to the spool 14, by this relative rotation, the trigger wire 22 is pulled towards its base end side. The leading end portion 22B of the trigger wire 22 comes out from the hole portion 120 of the clutch guide 60 and the hole portion 122 of the clutch cover 64 due to this pulling of the trigger wire 22 towards the base end side. When this occurs, the clutch guide 60 relative rotates in the take-up direction with respect to the clutch cover 64 due to the biasing force of the coil springs 70 that has been compressed up until this time.

This relative rotation of the clutch guide 60 causes the clutch plates 66 to rotate about the swing shafts 110, with the leading ends of the clutch plates 66 projecting out towards the rotation radial direction outside of the clutch guide 60. When the leading end sides of the clutch plates 66 project out in this manner, the knurled tooth portions 66A of the clutch plates 66 enmesh with the knurled tooth portion 214A of the lock ring 214, restricting relative rotation of the clutch plates 66 with respect to the lock ring 214, and restricting relative rotation of the lock ring 214 with respect to the spool 14.

When the occupant 152 sitting in the seat 142 has a small frame (build), the seat 142 is positioned comparatively further towards the vehicle front side, and therefore the body of the occupant 152 is also positioned comparatively further towards the vehicle front side. In this state, there is a large pull-out amount from the spool 14 of the webbing 16 that is entrained over the body of the occupant 152. Due to the large pull-out amount of the webbing 16 from the spool 14 when the rotation position of the spool 14 reaches or exceeds a rotation position corresponding to the specific position between the empty latched state and the fully pulled-out state, the restriction wall 322 does not face the pin 306 at the circular hole 208 radial direction outside.

Accordingly, when the lock ring 214 rotates in the pull-out direction together with the spool 14 and due thereto the slide stopper 302 rotates in the pull-out direction together with the lock ring 214, the inner wall of the guide groove 304 presses the pin 306 up towards the circular hole 208 radial direction outside. From this state, when the slide stopper 302 rotates further in the pull-out direction, the pin 306 comes out of the guide groove 304 as illustrated in FIG. 5 and FIG. 10. Due to this, when the link 284 moves towards the circular hole 208 radial direction outside guided by the link guides 282, the pin 290 of the stopper pawl 218 is accordingly pressed up in the inner peripheral portion of the guide frame 286.

Due to this, when the stopper pawl 218 thus swings about the shaft portion 226 in the switching direction of the present exemplary embodiment, the stopper pawl 218 moves from the engaged position towards the disengaged position, and the leading end of the stopper pawl 218 comes out of the notch portion 224 formed in the flange portion 216 of the lock ring 214. Since rotation of the lock ring 214 is not restricted in this state, the lock ring 214 rotates in the pull-out direction together with the spool 14. Such as this, when the lock ring 214 has rotated by the specific angle in the pull-out direction together with the spool 14 accompanying the slide stopper 302 until the pin 306 comes out of the guide groove 304, rotation of the slide stopper 302 in the pull-out direction is restricted by the stopper guide 310.

In this state, when the lock ring 214 attempts to rotate further in the pull-out direction together with the spool 14, the lock ring 214 imparts a shear load exceeding the mechanical strength of the shear pin 316. The shear pin 316 is thus broken, releasing the coupling between the lock ring 214 and the slide stopper 302, and the lock ring 214 rotates in the pull-out direction together with the spool 14.

Accordingly, in a state in which the rotation of the lock ring 214 in the pull-out direction is not restricted and the lock ring 214 rotates in the pull-out direction together with the spool 14, twisting deformation of the sub energy absorption portion 54 does not occur in the sub torsion shaft 24. The size of the rotation force with which the spool 14 is capable of rotating in the pull-out direction rotation in this state reaches a size capable of causing twisting deformation of the main energy absorption portion 44 of the main torsion shaft 20.

When the occupant 152 sitting in the seat 142 has a large frame (build), the seat 142 is positioned comparatively further towards the vehicle rear side. In this state, there is a small pull-out amount from the spool 14 of the webbing 16 that is entrained over the body of the occupant 152. Due to the small pull-out amount of the webbing 16 from the spool 14 when the rotation position of the spool 14 does not reach the rotation position corresponding to the specific position between the empty latched state and the fully pulled-out state described above, the restriction wall 322 faces the pin 306 at the circular hole 208 radial direction outer side further than the pin 306.

Figure 11:
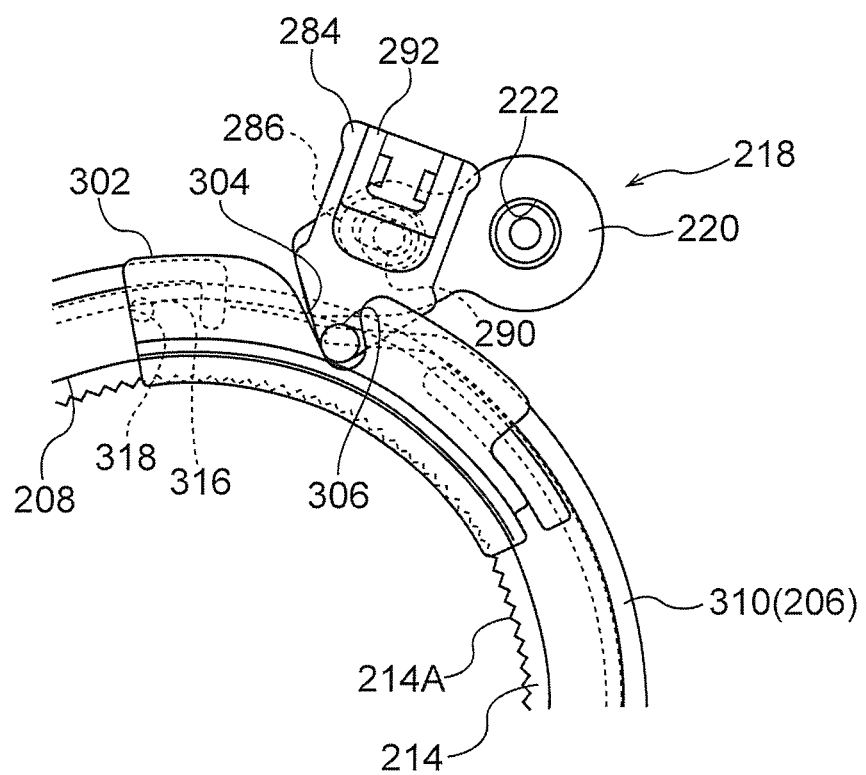
FIG. 11 is a side view illustrating a state in which movement of a switching section in a switching direction is restricted.

When the inner wall of the guide groove 304 attempts to press the pin 306 of the link 284 up towards the circular hole 208 radial direction outside accompanying rotation of the lock ring 214 in the pull-out direction interlockingly to the spool 14, the restriction wall 322 contacts (abuts) the pin 306 as illustrated in FIG. 11, thereby restricting movement of the pin 306. Movement (rotation) of the slide stopper 302 in the pull-out direction is accordingly restricted due to movement of the pin 306 being restricted. When the lock ring 214 attempts to rotate further in the pull-out direction together with the spool 14 in this state, the lock ring 214 imparts a shear force exceeding the mechanical strength of the shear pin 316. The shear pin 316 thereby breaks, thus releasing the coupling between the lock ring 214 and the slide stopper 302, and the lock ring 214 rotates in the pull-out direction together with the spool 14.

However, in this state, since the pin 306 does not move the outside of the slide stopper 302, the guide frame 286 of the link 284 does not press up the pin 290 of the stopper pawl 218. Accordingly, in this state, the stopper pawl 218 is not swung, and the state is still state of the leading end of the stopper pawl 218 being inside the notch portion 224 of the lock ring 214. In this state, when the shear pin 316 is broken and the lock ring 214 rotates in the pull-out direction together with the spool 14, the leading end side of the stopper pawl 218 contacts (abuts) the inner peripheral portion of the notch portion 224, thereby restricting rotation of the lock ring 214 in the pull-out direction.

Due to this, rotation of the sleeve 58 in the pull-out direction is accordingly restricted. In this state, when the spool 14 rotates further in the pull-out direction, the spool side engagement portion 50 rotates in the pull-out direction with respect to the sleeve side engagement portion 52 of the sub torsion shaft 24, and twisting deformation of the sub energy absorption portion 54 occurs. In this state, the size of the rotation force of the pull-out direction rotation of which the spool 14 is capable reaches a size that is capable of causing twisting deformation of both the main energy absorption portion 44 of the main torsion shaft 20 and the sub energy absorption portion 54 of the sub torsion shaft 24.

As described above, in the webbing take-up device 10 the size of the rotation force (load) required to rotate the spool 14 in the pull-out direction in the actuated state of the lock mechanism can be switched according to the frame (build) of the occupant 152.

Moreover, in the webbing take-up device 10, the switching described above is performed by the notch portion 224 that operates according to the pull-out amount of the webbing 16 from the spool 14. A reduction in costs can accordingly be achieved in comparison to a configuration in which switching is performed using an electrical component such as a limit switch, or a gas generator.

Moreover, in the present exemplary embodiment, when the pin 306 attempts to move towards the open end side of the guide groove 304 in a state in which the restriction wall 322 is facing the pin 306 at the circular hole 208 radial direction outside, the pin 306 contacts (abuts) the restriction wall 322, so, movement of the link 284 and therefore also movement of the stopper pawl 218 in the direction to come out from the notch portion 224 are restricted. The restriction wall 322 simply passes at the lateral side (the circular hole 208 radial direction outside with respect to the pin 306) of the pin 306 with rotation of the cam gear 244.

Accordingly, the restriction wall 322 is not for example configured so as to actively move the link 284, but the restriction wall 322 is simply configured to restrict movement of the link 284 by interfering on the pin 306 that is attempting to move. Accordingly, during normal usage, the link 284 and the stopper pawl 218, and also the slide stopper 302, are not moved even though the spool 14 rotating in the take-up direction or the pull-out direction. There is accordingly no operation noise from the link 284, the stopper pawl 218 and the slide stopper 302 during pull-out and take-up of the webbing 16 during normal usage, and there is a desirable user sensation during pull-out or take-up of the webbing 16 during normal usage.

Moreover, in the present exemplary embodiment, the restriction wall 322 is not configured so as to actively move components such as the link 284, but is simply configured to restrict movement of the link 284 by interfering on the pin 306 that is attempting to move. Regardless of the number of revolutions undergone by the cam gear 244, the pin 306 does not interfere with the restriction wall 322 as long as the link 284 does not move. Namely, the link 284, the stopper pawl 218, and the slide stopper 302 would not be operated even if the number of revolutions of the cam gear 244, between the housed state and the fully pulled-out state, were to exceed one revolution. Thus even though the number of revolutions of the cam gear 244, between the empty latched state and the fully pulled-out state, is set at less than one revolution, a large rotation angle can be set therefor. The precision of the range within which the restriction wall 322 restricts movement of the pin 306 can accordingly be increased.

Note that in the present exemplary embodiment, configuration is made wherein in the initial state, the leading end of the stopper pawl 218 is entered inside the notch portion 224, and the leading end of the stopper pawl 218 comes out of the notch portion 224 when the link 284 moves. However, configuration may for example be made wherein in the initial state, the leading end of the stopper pawl 218 is come out of the notch portion 224, and the leading end of the stopper pawl 218 enters in the notch portion 224 when the link 284 moves, to give a configuration wherein maintaining the state of the leading end of the stopper pawl 218 being come out of the notch portion 224 by the restriction member restricting movement of the link 284.

In the present exemplary embodiment, configuration is made wherein movement of the link 284, and therefore also movement of the stopper pawl 218, is restricted due to the restriction wall 322 contacting (abutting) the pin 306 of the link 284. However configuration may also be made wherein restricting movement of the stopper pawl 218 by the restriction member contacting (abutting) the stopper pawl 218 directly.

What is claimed is:

1. A webbing take-up device comprising:
   a spool that is rotated in a pull-out direction by a webbing that is taken up thereon being pulled out;
   an energy absorption shaft member that has one end connected to the spool in a state in which relative rotation with respect to the spool is restricted, and that is deformed by a portion of the energy absorption shaft member connected to the spool rotating relative to another end of the energy absorption shaft member;
   a rotatable lock ring that, by being actuated, is connected to the another end of the energy absorption shaft member in a state in which relative rotation with respect to the another end of the energy absorption shaft member is restricted, and that is capable of rotating together with the energy absorption shaft member;

a switching section that, by engaging with the rotatable lock ring at an engaged position, restricts rotation of the rotatable lock ring accompanying rotation of the spool in the pull-out direction, that releases engagement with respect to the rotatable lock ring at a disengaged position which is apart from the engaged position, and that moves in a switching direction, which is from the engaged position toward the disengaged position or from the disengaged position toward the engaged position, interlockingly with rotation of the rotatable lock ring accompanying rotation of the spool in the pull-out direction; and a switching restriction member that rotates interlockingly with the spool, and that includes a switching restriction portion that faces the switching section at the switching direction side of the switching section at a specific position along an angular range of movement of the switching restriction member so that the switching restriction portion restricts movement of the switching section towards the switching direction when moved within said angular range.

2. The webbing take-up device of claim 1, further comprising:

a guiding section that directly or indirectly engages with each of the rotatable lock ring and the switching section, and that guides the switching section in the switching direction by moving interlockingly with rotation of the rotatable lock ring through a specific angle.

3. The webbing take-up device of claim 2, further comprising:

a deformation portion that is provided at the guiding section or at the rotatable lock ring, that is deformed by rotation force of the rotatable lock ring in a state in which movement of the switching section in the switching direction is restricted by the switching restriction member, and that, by deforming, permits the rotatable lock ring to rotate through at least the specific angle.

4. The webbing take-up device of claim 3, wherein:

the deformation portion is configured by a shear pin, the shear pin couples the guiding section and the rotatable lock ring so as to move the guiding section accompanying rotation of the rotatable lock ring, and the shear pin releases coupling of the guiding section and the rotatable lock ring by breaking due to rotation of the rotatable lock ring accompanying rotation of the spool in the pull-out direction in a state in which movement of the guiding section is restricted.

5. The webbing take-up device of claim 2, wherein:

the switching section includes a rotation restriction member, the rotation restriction member is positioned in the engaged position in an initial state, the rotation restriction member restricts rotation of the rotatable lock ring by abutting an engagement portion, which is formed at the rotatable lock ring, due to rotation of the rotatable lock ring accompanying rotation of the spool in the pull-out direction, the rotation restriction member moves away from the rotatable lock ring by moving in the switching direction, and the rotation restriction member is retained at the disengaged position after moving in the switching direction.

6. The webbing take-up device of claim 2, wherein:

the energy absorption shaft member is a first energy absorption member serving as a sub shaft member, and the webbing take-up device further comprises:

a second energy absorption member serving as a main shaft member, that has one end connected to the spool in a state in which relative rotation with respect to the spool is restricted, and that is deformed by a portion of the second energy absorption member connected to the spool rotating relative to another end of the second energy absorption member;

a lock mechanism that actuates in a rapid deceleration state of a vehicle or in a case in which the spool reaches a predetermined rotation acceleration or higher in the pull-out direction, to restrict rotation of the another end of the second energy absorption member in the pull-out direction; and a trigger member that places the rotatable lock ring in an actuated state by connecting the rotatable lock ring to the another end of the first energy absorption member in a state in which the one end of the second energy absorption member has rotated through a specific angle or greater in the pull-out direction with respect to the another end of the second energy absorption member.

7. The webbing take-up device of claim 2, further comprising a reduction section that is interposed between the spool and the switching restriction member, and that rotates the switching restriction member by transmitting rotation of the spool to the switching restriction member while reducing a rotation, wherein:

a reduction ratio, from the spool to the switching restriction member, of the reduction section is set such that a number of rotations of the spool as the spool rotates from an empty latched state to a fully pulled-out state is transmitted to the switching restriction member to be reduced less than one revolution, and a number of rotations of the spool as the spool rotates from a housed state to the fully pulled-out state is transmitted to the switching restriction member to be reduced one revolution or more, the empty latched state is a state in which a tongue provided at the webbing is attached in a buckle in a state in which an occupant is not seated in a seat;

the fully pulled-out state is a state in which all of the webbing has been pulled out from the spool; and the housed state is a state in which the webbing has been taken up onto the spool as far as a vicinity of a leading end of the webbing.

8. The webbing take-up device of claim 1, wherein:

the switching section includes a rotation restriction member, the rotation restriction member is positioned in the engaged position in an initial state, the rotation restriction member restricts rotation of the rotatable lock ring by abutting an engagement portion, which is formed at the rotatable lock ring, due to rotation of the rotatable lock ring accompanying rotation of the spool in the pull-out direction, the rotation restriction member moves away from the rotatable lock ring by moving in the switching direction, and the rotation restriction member is retained at the disengaged position after moving in the switching direction.

9. The webbing take-up device of claim 1, wherein:

the energy absorption shaft member is a first energy absorption member serving as a sub shaft member, and the webbing take-up device further comprises:

a second energy absorption member serving as a main shaft member, that has one end connected to the spool in a state in which relative rotation with respect to the spool is restricted, and that is deformed by a portion of the second energy absorption member connected to the spool rotating relative to another end of the second energy absorption member;

a lock mechanism that actuates in a rapid deceleration state of a vehicle or in a case in which the spool reaches a predetermined rotation acceleration or higher in the pull-out direction, to restrict rotation of the another end of the second energy absorption member in the pull-out direction; and a trigger member that places the rotatable lock ring in an actuated state by connecting the rotatable lock ring to the another end of the first energy absorption member in a state in which the one end of the second energy absorption member has rotated through a specific angle or greater in the pull-out direction with respect to the another end of the second energy absorption member.

10. The webbing take-up device of claim 1, further comprising a reduction section that is interposed between the spool and the switching restriction member, and that rotates the switching restriction member by transmitting rotation of the spool to the switching restriction member while reducing a rotation, wherein:

a reduction ratio, from the spool to the switching restriction member, of the reduction section is set such that a number of rotations of the spool as the spool rotates from an empty latched state to a fully pulled-out state is transmitted to the switching restriction member to be reduced less than one revolution, and a number of rotations of the spool as the spool rotates from a housed state to the fully pulled-out state is transmitted to the switching restriction member to be reduced one revolution or more, the empty latched state is a state in which a tongue provided at the webbing is attached in a buckle in a state in which an occupant is not seated in a seat;

the fully pulled-out state is a state in which all of the webbing has been pulled out from the spool; and the housed state is a state in which the webbing has been taken up onto the spool as far as a vicinity of a leading end of the webbing.

11. The webbing take-up device of claim 10, wherein the switching restriction portion is provided so as to pass, by rotation, at a lateral side of the switching section at the switching direction side.

12. The webbing take-up device of claim 1, wherein the switching restriction member rotates about a same axis of rotation as the spool.

13. The webbing take-up device of claim 1, wherein in a state in which the switching restriction portion faces the switching section at the switching direction side of the switching section, the movement of the switching section towards the switching direction is restricted by the switching section abutting the switching restriction portion.

* * * * *